US011659894B2

(12) United States Patent
Cross

(10) Patent No.: US 11,659,894 B2
(45) Date of Patent: *May 30, 2023

(54) SOLE SYSTEM FOR AN ARTICLE OF FOOTWEAR INCORPORATING A KNITTED COMPONENT

(71) Applicant: NIKE, Inc., Beaverton, OR (US)

(72) Inventor: Tory M. Cross, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/080,043

(22) Filed: Oct. 26, 2020

(65) Prior Publication Data
US 2021/0037920 A1 Feb. 11, 2021

Related U.S. Application Data

(63) Continuation of application No. 15/847,533, filed on Dec. 19, 2017, now Pat. No. 10,813,409, which is a (Continued)

(51) Int. Cl.
*A43B 23/04* (2006.01)
*A43B 23/02* (2006.01)
(Continued)

(52) U.S. Cl.
CPC .............. *A43B 23/042* (2013.01); *A43B 1/04* (2013.01); *A43B 13/02* (2013.01); *A43B 13/223* (2013.01); *A43B 23/0205* (2013.01); *A43B 23/0245* (2013.01); *A43C 15/161* (2013.01); *B29D 35/122* (2013.01)

(58) Field of Classification Search
CPC .............. A43B 23/042; A43B 23/0205; A43B 23/0245; A43B 1/04; A43B 13/223; A43C 15/161
See application file for complete search history.

(56) References Cited

U.S. PATENT DOCUMENTS 1,791,177 A 2/1931 Tassel, Jr.
1,852,883 A 4/1932 Gustaveson
(Continued)

FOREIGN PATENT DOCUMENTS

CN 201878889 U 6/2011
CN 104106874 A 10/2014
(Continued)

OTHER PUBLICATIONS

Non-Final Office Action received for U.S. Appl. No. 16/800,158, dated Jan. 28, 2022, 22 pages.
(Continued)

*Primary Examiner* — Bao-Thieu L Nguyen
(74) *Attorney, Agent, or Firm* — Shook, Hardy & Bacon L.L.P.

(57) ABSTRACT

A sole system for an article of footwear may include one or more of the following: a knitted component including an underfoot portion having a plurality of knitted cleat members; and an outsole cover assembly having a plurality of recesses corresponding to the plurality of knitted cleat members of the knitted component. The outsole cover assembly may substantially cover the underfoot portion of the knitted component.

16 Claims, 23 Drawing Sheets

Related U.S. Application Data continuation of application No. 14/598,389, filed on Jan. 16, 2015, now Pat. No. 9,848,673.

(51) Int. Cl.
| | |
|---|---|
| *A43C 15/16* | (2006.01) |
| *A43B 1/04* | (2022.01) |
| *A43B 13/02* | (2022.01) |
| *A43B 13/22* | (2006.01) |
| *B29D 35/12* | (2010.01) |

(56) References Cited

U.S. PATENT DOCUMENTS

| | | |
|---|---|---|
| 1,877,080 A | 9/1932 | Isago |
| 2,342,466 A | 2/1944 | Hiram |
| 2,386,667 A | 10/1945 | Doherty |
| 3,087,262 A | 4/1963 | Russell |
| 3,352,032 A | 11/1967 | Hideo |
| 3,834,046 A | 9/1974 | Fowler |
| 4,040,275 A | 8/1977 | Castello |
| 4,149,274 A | 4/1979 | Garrou et al. |
| 4,187,620 A | 2/1980 | Selner |
| 4,348,003 A | 9/1982 | Beneteau |
| 4,356,643 A | 11/1982 | Kester et al. |
| 4,631,221 A | 12/1986 | Disselbeck et al. |
| 4,651,354 A | 3/1987 | Petrey |
| 5,077,916 A | 1/1992 | Beneteau |
| 5,086,576 A | 2/1992 | Lamson |
| 5,330,818 A | 7/1994 | Langley |
| 5,367,791 A | 11/1994 | Gross et al. |
| 5,452,526 A | 9/1995 | Collins |
| 5,537,762 A | 7/1996 | Walters |
| 5,595,003 A | 1/1997 | Snow |
| 5,619,809 A | 4/1997 | Sessa |
| 5,836,094 A | 11/1998 | Figel |
| 5,896,680 A | 4/1999 | Kim et al. |
| 5,926,974 A | 7/1999 | Friton |
| 6,007,898 A | 12/1999 | Kim et al. |
| 6,029,376 A | 2/2000 | Cass |
| 6,145,221 A | 11/2000 | Hockerson |
| 6,412,196 B1 | 7/2002 | Gross |
| 6,430,844 B1 | 8/2002 | Otis et al. |
| 6,571,491 B2 | 6/2003 | Safdeye et al. |
| 6,598,324 B1 | 7/2003 | Tsuji |
| 6,658,766 B2 | 12/2003 | Kraeuter et al. |
| 6,685,011 B2 | 2/2004 | Nishiwaki et al. |
| 6,691,432 B2 | 2/2004 | Masseron |
| 6,698,109 B2 | 3/2004 | Otis et al. |
| 6,701,643 B2 | 3/2004 | Geer et al. |
| 6,708,342 B2 | 3/2004 | Boersema |
| 6,729,046 B2 | 5/2004 | Ellis, III |
| 6,751,890 B1 | 6/2004 | Tsai |
| 6,782,642 B2 | 8/2004 | Knoche et al. |
| 6,813,847 B2 | 11/2004 | Workman |
| 6,823,611 B2 | 11/2004 | Otis et al. |
| 6,840,066 B2 | 1/2005 | Dickerson |
| 6,845,572 B1 | 1/2005 | Haimerl et al. |
| 6,931,762 B1 | 8/2005 | Dua |
| 6,968,637 B1 | 11/2005 | Johnson |
| 6,986,269 B2 | 1/2006 | Dua |
| 7,013,581 B2 | 3/2006 | Greene et al. |
| 7,036,246 B2 | 5/2006 | Otis et al. |
| 7,048,881 B2 | 5/2006 | Otis et al. |
| 7,111,415 B2 | 9/2006 | Hockerson |
| 7,146,750 B2 | 12/2006 | Issler |
| 7,178,267 B2 | 2/2007 | Skaja et al. |
| 7,313,876 B2 | 1/2008 | Morgan et al. |
| 7,322,131 B2 | 1/2008 | Yamashita et al. |
| 7,347,011 B2 | 3/2008 | Dua et al. |
| 7,353,626 B2 | 4/2008 | Otis et al. |
| 7,444,766 B2 | 11/2008 | Mitchell |
| 7,467,484 B2 | 12/2008 | Chang et al. |
| 7,487,555 B2 | 2/2009 | Takeda et al. |
| 7,540,100 B2 | 6/2009 | Pawlus et al. |
| 7,555,847 B2 | 7/2009 | Kendall |
| 7,587,915 B2 | 9/2009 | Kaneda |
| 7,591,083 B2 | 9/2009 | Geer et al. |
| 7,703,220 B2 | 4/2010 | Aveni |
| 7,712,229 B2 | 5/2010 | Yang |
| 7,788,827 B2 | 9/2010 | Fogg et al. |
| 7,793,428 B2 | 9/2010 | Shenone |
| 7,793,434 B2 | 9/2010 | Sokolowski et al. |
| 7,797,856 B2 | 9/2010 | Andrews et al. |
| 7,854,076 B2 | 12/2010 | Keppler et al. |
| 7,882,648 B2 | 2/2011 | Langvin |
| 3,029,715 A1 | 10/2011 | Fogg et al. |
| 8,197,736 B2 | 6/2012 | Frasson et al. |
| 8,225,530 B2 | 7/2012 | Sokolowski et al. |
| 8,387,282 B2 | 3/2013 | Baker et al. |
| 8,474,155 B2 | 7/2013 | Mcdonald et al. |
| 8,490,229 B2 | 7/2013 | Mintz |
| 8,505,216 B2 | 8/2013 | Sokolowski et al. |
| 8,505,220 B2 | 8/2013 | James et al. |
| 8,567,097 B2 | 10/2013 | Edy et al. |
| 8,577,751 B2 | 11/2013 | Langvin |
| 8,713,819 B2 | 5/2014 | Auger et al. |
| 8,756,834 B1 | 6/2014 | Halberstadt et al. |
| 8,776,397 B2 | 7/2014 | Borel et al. |
| 8,813,390 B2 | 8/2014 | Auger et al. |
| 8,839,532 B2 | 9/2014 | Huffa et al. |
| 8,914,998 B2 | 12/2014 | Gheorghian et al. |
| 9,078,488 B1 | 7/2015 | Meir et al. |
| 9,326,562 B2 | 5/2016 | Weidl et al. |
| 9,775,401 B2 | 10/2017 | Cross et al. |
| 9,848,673 B2 * | 12/2017 | Cross ............... A43B 23/0245 |
| 10,568,383 B2 | 2/2020 | Cross et al. |
| 10,813,409 B2 * | 10/2020 | Cross ............... A43B 23/0205 |
| 2002/0035796 A1 | 3/2002 | Knoche et al. |
| 2002/0116843 A1 | 8/2002 | Harrison |
| 2002/0148140 A1 | 10/2002 | Otis et al. |
| 2002/0148141 A1 | 10/2002 | Otis et al. |
| 2002/0152639 A1 | 10/2002 | Otis et al. |
| 2002/0162248 A1 | 11/2002 | Otis et al. |
| 2003/0033207 A1 | 2/2003 | Litke et al. |
| 2004/0028929 A1 | 2/2004 | Chang |
| 2004/0148803 A1 | 8/2004 | Grove et al. |
| 2005/0071242 A1 | 3/2005 | Allen et al. |
| 2005/0120593 A1 | 6/2005 | Mason |
| 2005/0198868 A1 | 9/2005 | Scholz |
| 2005/0241182 A1 | 11/2005 | Otis et al. |
| 2006/0059716 A1 | 3/2006 | Yamashita et al. |
| 2006/0143946 A1 | 7/2006 | Otis et al. |
| 2008/0110048 A1 | 5/2008 | Dua et al. |
| 2008/0263900 A1 | 10/2008 | Determe et al. |
| 2009/0090024 A1 | 4/2009 | Phlawadana et al. |
| 2009/0181590 A1 | 7/2009 | Hansen et al. |
| 2009/0183389 A1 | 7/2009 | Miller et al. |
| 2009/0320326 A1 | 12/2009 | Keppler et al. |
| 2010/0112275 A1 | 5/2010 | Hansen et al. |
| 2010/0146823 A1 | 6/2010 | Yabushita et al. |
| 2010/0154256 A1 | 6/2010 | Dua |
| 2010/0186265 A1 | 7/2010 | Evans et al. |
| 2010/0235258 A1 | 9/2010 | Langvin |
| 2011/0047816 A1 | 3/2011 | Nurse |
| 2011/0047833 A1 | 3/2011 | Tai |
| 2011/0167677 A1 | 7/2011 | Peikert et al. |
| 2011/0302807 A1 | 12/2011 | Mcduff |
| 2012/0180343 A1 | 7/2012 | Auger et al. |
| 2012/0233882 A1 | 9/2012 | Huffa et al. |
| 2012/0234052 A1 | 9/2012 | Huffa et al. |
| 2012/0317841 A1 | 12/2012 | Taylor et al. |
| 2013/0019499 A1 | 1/2013 | Hsu |
| 2013/0091741 A1 | 4/2013 | Frank |
| 2013/0174445 A1 | 7/2013 | Hakkala et al. |
| 2013/0232823 A1 | 9/2013 | Kasprzak |
| 2013/0269212 A1 | 10/2013 | Little |
| 2013/0276333 A1 | 10/2013 | Wawrousek et al. |
| 2013/0318831 A1 | 12/2013 | Foxen |
| 2013/0326911 A1 | 12/2013 | Baucom et al. |
| 2013/0340289 A1 | 12/2013 | Thevenoud |
| 2013/0340290 A1 | 12/2013 | Hartmann |
| 2013/0340295 A1* | 12/2013 | Adami ............... A43B 5/02 12/146 B |
| 2014/0020192 A1 | 1/2014 | Jones et al. |

(56) References Cited

U.S. PATENT DOCUMENTS

| | | |
|---|---|---|
| 2014/0026438 A1 | 1/2014 | Cortez et al. |
| 2014/0068968 A1 | 3/2014 | Podhajny et al. |
| 2014/0082964 A1 | 3/2014 | Lin |
| 2014/0123520 A1 | 5/2014 | Tayar |
| 2014/0150297 A1 | 6/2014 | Holmes et al. |
| 2014/0202039 A1 | 7/2014 | Geer et al. |
| 2014/0223777 A1* | 8/2014 | Whiteman ............ A43B 13/14 36/102 |
| 2014/0245632 A1 | 9/2014 | Podhajny et al. |
| 2014/0245633 A1 | 9/2014 | Podhajny |
| 2014/0290099 A1 | 10/2014 | Corbett |
| 2014/0310983 A1 | 10/2014 | Tamm et al. |
| 2014/0310984 A1 | 10/2014 | Tamm et al. |
| 2014/0310985 A1 | 10/2014 | Tran et al. |
| 2014/0310986 A1* | 10/2014 | Tamm ................. A43B 13/187 12/142 T |
| 2014/0345164 A1 | 11/2014 | Campbell et al. |
| 2014/0352179 A1 | 12/2014 | Bell et al. |
| 2014/0366402 A1 | 12/2014 | Cavaliere et al. |
| 2014/0373392 A1 | 12/2014 | Cullen |
| 2015/0013187 A1 | 1/2015 | Taniguchi et al. |
| 2015/0040436 A1 | 2/2015 | Clerc et al. |
| 2015/0040438 A1 | 2/2015 | Baucom et al. |
| 2015/0052778 A1 | 2/2015 | Kirk et al. |
| 2015/0068064 A1 | 3/2015 | Morag et al. |
| 2015/0113831 A1 | 4/2015 | Weingart et al. |
| 2015/0128449 A1 | 5/2015 | Lin et al. |
| 2015/0201707 A1 | 7/2015 | Bruce |
| 2015/0223552 A1 | 8/2015 | Love et al. |
| 2015/0245684 A2 | 9/2015 | Heard et al. |
| 2015/0250256 A1 | 9/2015 | Podhajny |
| 2015/0257484 A1 | 9/2015 | Campbell et al. |
| 2015/0273778 A1 | 10/2015 | Campos et al. |
| 2015/0320139 A1 | 11/2015 | Peitzker |
| 2015/0351493 A1 | 12/2015 | Ashcroft et al. |
| 2016/0000173 A1 | 1/2016 | Spielmann et al. |
| 2016/0031164 A1 | 2/2016 | Downs et al. |
| 2016/0066651 A1 | 3/2016 | Terai et al. |
| 2016/0073727 A1 | 3/2016 | Bier et al. |
| 2016/0073728 A1 | 3/2016 | Peikert et al. |
| 2016/0081419 A1 | 3/2016 | Theoklitos et al. |
| 2016/0095377 A1 | 4/2016 | Tamm |
| 2016/0114546 A1 | 4/2016 | Yang |
| 2016/0206039 A1 | 7/2016 | Cross et al. |
| 2016/0206040 A1 | 7/2016 | Cross et al. |
| 2016/0206042 A1 | 7/2016 | Cross et al. |
| 2016/0206046 A1 | 7/2016 | Cross |
| 2016/0262494 A1 | 9/2016 | Weidl |
| 2018/0103726 A1 | 4/2018 | Cross |
| 2019/0014854 A1 | 1/2019 | Santos et al. |
| 2019/0223543 A1 | 7/2019 | Tamm et al. |
| 2020/0187591 A1 | 6/2020 | Cross et al. |

FOREIGN PATENT DOCUMENTS

| | | |
|---|---|---|
| CN | 203897435 U | 10/2014 |
| DE | 4214831 A1 | 11/1993 |
| EP | 2792265 A2 | 10/2014 |
| GB | 2063054 A | 6/1981 |
| GB | 2092881 A | 8/1982 |
| JP | H06284905 A | 10/1994 |
| JP | 2013231261 A | 11/2013 |
| JP | 2014210177 A | 11/2014 |
| KR | 10-2015-0096509 A | 8/2015 |
| KR | 10-2015-0135351 A | 12/2015 |
| TW | 228469 B | 8/1994 |
| TW | M447111 U | 2/2013 |
| WO | 9943229 A1 | 9/1999 |
| WO | 2009149886 A1 | 12/2009 |
| WO | 2014100462 A1 | 6/2014 |
| WO | 2014152333 A1 | 9/2014 |
| WO | 2017/100462 A2 | 6/2017 |

OTHER PUBLICATIONS

Office Action received for European Patent Application No. 16704289. 4, dated Dec. 22, 2021, 5 pages.

"Adidas Primeknit FS Released—The First all-in-one football boot and sock hybrid", Available online at: <http://www.footyheadlines.com/2014/03/adidas-primeknit-fs-football-boot.html.>, Mar. 6, 2014, 5 pages.

"Adidas Soccer Unveils Primeknit FS, World's First Knitted Cleat/Sock Hybrid", Available online at: <http://solecollector.com/news/adidas-soccer-unveils-primeknit-fs-world-s-first-knitted-cleat-sock-hybrid/.>, Mar. 6, 2014, 2 pages.

"Adidas Unveils Samba Primeknit—First Knitted Soccer Cleat", Available online at: <http://solecollector.com/news/adidas-unveils-samba-primeknit-first-knitted-soccer-cleat>, Mar. 6, 2014, 3 pages.

Europe Patent Office Communication Pursuant to Rule 114(2) EPC, regarding Anonymous Third Party Submission received for for Europe Application No. 16701389.5, dated Aug. 26, 2020, 3 pages.

Office Action received for European Patent Application No. 16701389. 5, dated Mar. 15, 2021, 5 pages.

Office Action received for European Patent Application No. 16704289. 4, dated Apr. 6, 2021, 4 pages.

Sun, Jitian, "Practical Rubber Shoe Design", China Light Industry Press, Aug. 1996, pp. 216-219.

Office Action received for European Patent Application No. 16701389. 5, dated Feb. 17, 2022, 6 pages.

Final Office Action received for U.S. Appl. No. 16/800,158, dated Jul. 18, 2022, 19 pages.

Notice of Allowance received for U.S. Appl. No. 16/800,158, dated Oct. 19, 2022, 10 pages.

Intention to Grant received for European Patent Application No. 16704289.4, dated Oct. 26, 2022, 7 pages.

Office Action received for European Patent Application No. 16701389. 5, dated Oct. 27, 2022, 4 pages.

Office Action received for European Patent Application No. 16701389. 5, dated Mar. 6, 2023, 3 pages.

* cited by examiner

SOLE SYSTEM FOR AN ARTICLE OF FOOTWEAR INCORPORATING A KNITTED COMPONENT

CROSS-REFERENCE TO RELATED APPLICATIONS

This application is a continuation of U.S. patent application Ser. No. 15/847,533, filed Dec. 19, 2017, which is a continuation of U.S. patent application Ser. No. 14/598,389, filed Jan. 16, 2015. All applications listed in this paragraph are hereby incorporated by reference in their entireties.

BACKGROUND

The present disclosure relates generally to a vacuum formed knit sole system for an article of footwear incorporating a knitted component. The present disclosure also relates to an article of footwear comprising the knitted component forming the knit sole system. The present disclosure further is related generally to a method of vacuum forming the knitted component using an insert member to form the knit sole system.

Conventional articles of footwear generally include two primary elements, an upper and a sole structure. The upper is secured to the sole structure and forms a void on the interior of the footwear for comfortably and securely receiving a foot. The sole structure is secured to a lower area of the upper, thereby being positioned between the upper and the ground. In athletic footwear, for example, the sole structure may include a midsole and an outsole. The midsole often includes a polymer foam material that attenuates ground reaction forces to lessen stresses upon the foot and leg during walking, running, and other ambulatory activities. Additionally, the midsole may include fluid-filled chambers, plates, moderators, or other elements that further attenuate forces, enhance stability, or influence the motions of the foot. The outsole is secured to a lower surface of the midsole and provides a ground-engaging portion of the sole structure formed from a durable and wear-resistant material, such as rubber. The sole structure may also include a sockliner positioned within the void and proximal a lower surface of the foot to enhance footwear comfort.

The upper generally extends over the instep and toe areas of the foot, along the medial and lateral sides of the foot, under the foot, and around the heel area of the foot. In some articles of footwear, such as basketball footwear and boots, the upper may extend upward and around the ankle to provide support or protection for the ankle. Access to the void on the interior of the upper is generally provided by an ankle opening in a heel region of the footwear. A lacing system is often incorporated into the upper to adjust the fit of the upper, thereby permitting entry and removal of the foot from the void within the upper. The lacing system also permits the wearer to modify certain dimensions of the upper, particularly girth, to accommodate feet with varying dimensions. In addition, the upper may include a tongue that extends under the lacing system to enhance adjustability of the footwear, and the upper may incorporate a heel counter to limit movement of the heel.

Articles of footwear often are constructed of many components. For example, an article of footwear may include many components, such as an upper, a sockliner, a strobel, a midsole, and an outsole. An outsole may have spikes, cleats, or other protrusions to provide additional traction under selected circumstances. Each of these components is attached to at least one, typically two, and maybe three or more of the other components. Some components thus are stitched to, adhered to, or otherwise attached to other components.

Construction of an article of footwear comprising many components may require that components having significantly different properties and characteristics must be attached to each other. For example, an upper may be formed from cloth, a midsole from soft foam, and an outsole from wear-resistant rubber. These components often can be adhered with adhesives. Adhesive may fail, causing delamination of the components. Further, wear may occur at joints between harder and softer materials, or between dissimilar materials. Therefore, such joints may cause premature failure of the article of footwear. Such joints also may provide uncomfortable sudden transitions between areas of softer or more compliant materials and areas of harder or more rigid materials.

Further, assembly of multiple components may be time-consuming and may lead to errors. For example, components from one style of an article of footwear may incorrectly be used on a different style of footwear. The number of potential errors and premature failures may be significant.

A variety of material elements (e.g., textiles, polymer foam, polymer sheets, leather, synthetic leather) are conventionally utilized in manufacturing an article of footwear. In athletic footwear, for example, the upper may have multiple layers that each include a variety of joined material elements. As examples, the material elements may be selected to impart stretch-resistance, wear-resistance, flexibility, air-permeability, compressibility, comfort, and moisture-wicking to different areas of the upper. Similarly, the sole structure may utilize a number of components to provide selected properties and characteristics. To impart the different properties to different areas of the article of footwear, material elements are often cut to desired shapes and then joined together, usually with stitching or adhesive bonding. Moreover, the material elements often are joined in a layered configuration to impart multiple properties to the same areas. As the number and type of material elements incorporated into the article of footwear increases, the time and expense associated with transporting, stocking, cutting, and joining the material elements also may increase. Waste material from cutting and stitching processes also accumulates to a greater degree as the number and type of material elements incorporated into the article of footwear increases. Moreover, articles of footwear with a greater number of material elements may be more difficult to recycle than articles of footwear formed from fewer types and numbers of material elements. By decreasing the number of material elements utilized in the article of footwear, therefore, waste may be decreased while increasing the manufacturing efficiency and recyclability of the upper.

Reducing the number of material elements may require that one material element provide multiple and additional properties and characteristics sought by users. Thus, there exists a need in the art for articles of footwear comprising a minimum number of material elements while providing a number of properties and characteristics sought by users.

SUMMARY

In one aspect, the invention provides an article of footwear including an upper and a sole system. The article of footwear comprises a knitted component formed of unitary knit construction, the knitted component including a knitted component lower portion forming a knit outsole of the sole system and a knitted component upper portion forming at least a portion the upper. An insert member can be disposed within an interior of the upper. The insert member having a plurality of protuberances extending away from a bottom side. The plurality of protuberances extending away from the bottom side of the insert member correspond with a plurality of cleat members extending away from an outsole bottom surface of the knit outsole.

In another aspect, the invention provides a method of manufacturing an article of footwear including an upper and a sole system incorporating a knitted component. The method includes knitting a knitted component upper portion and a knitted component lower portion of unitary knit construction so as to be a one-piece element. The method also includes providing an insert member having a plurality of protuberances on one side of the insert member and vacuum forming the knitted component lower portion around the insert member to form a knit outsole having a plurality of cleat members corresponding to the plurality of protuberances on the one side of the insert member. The method further includes incorporating the knitted component upper portion into at least a portion of the upper of the article of footwear.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
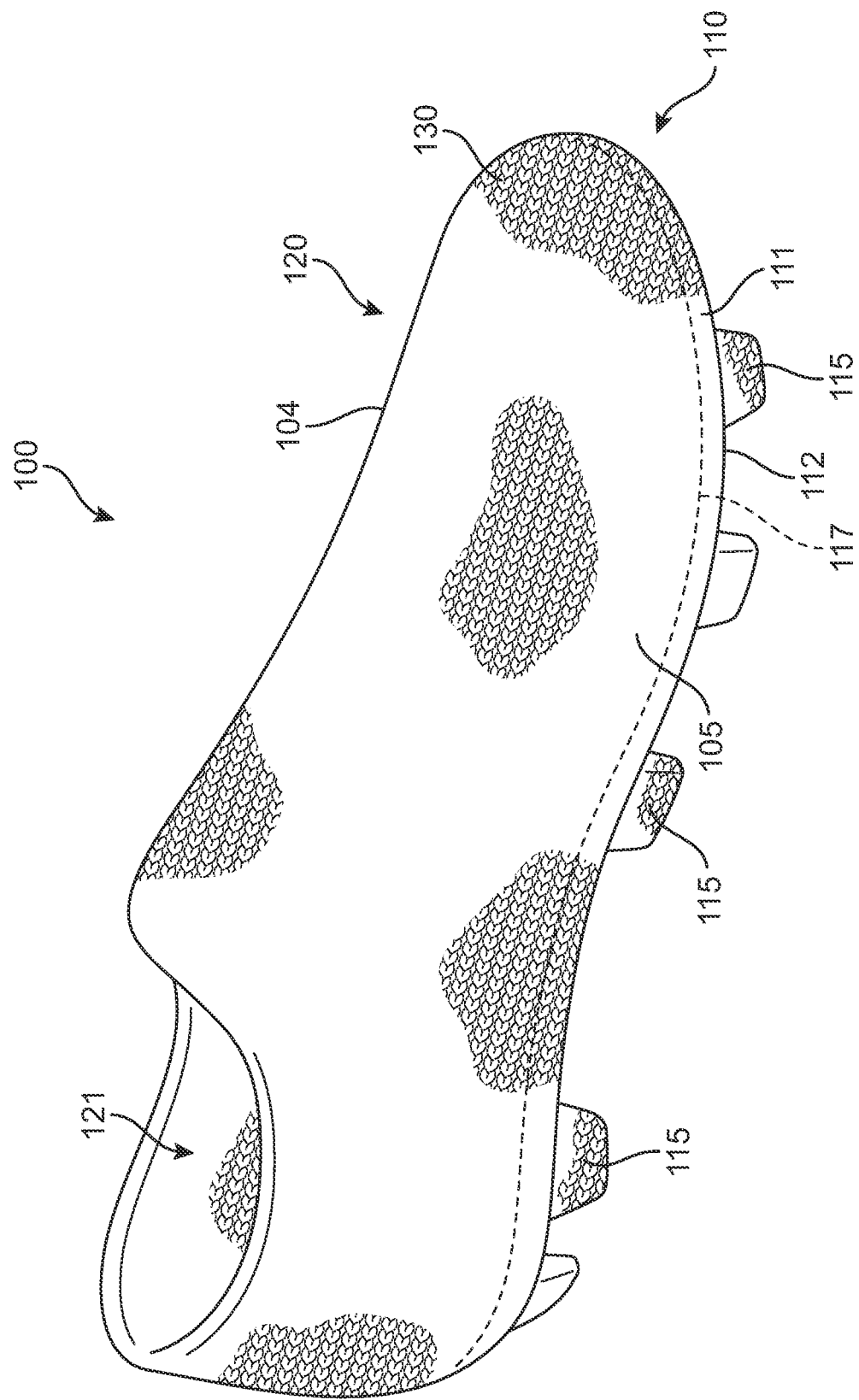
FIG. 1 is an isometric view of an exemplary embodiment of an article of footwear including a knit sole system.
Figure 2:
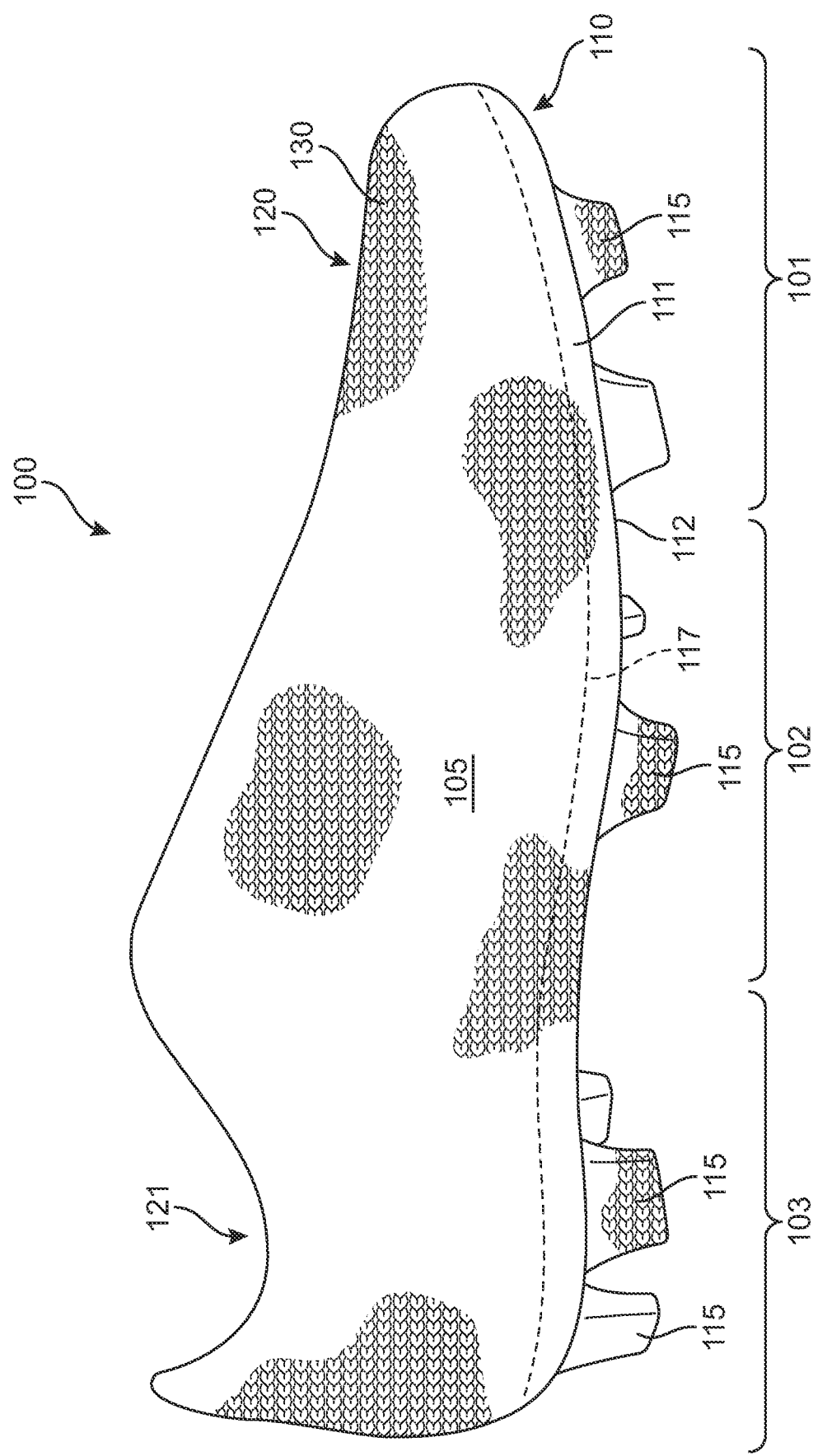
FIG. 2 is a lateral side view of the exemplary embodiment of an article of footwear including a knit sole system.
Figure 3:
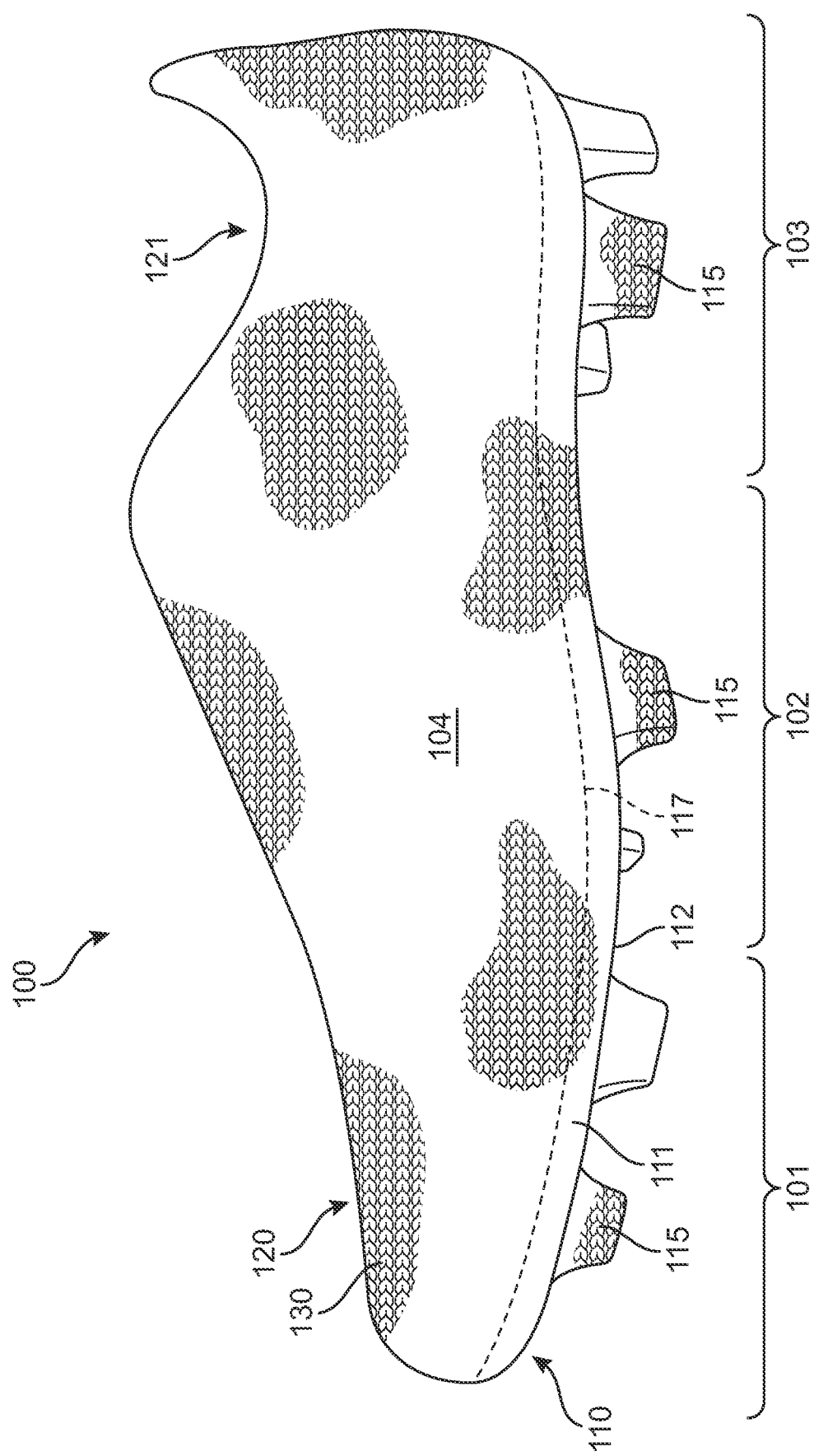
FIG. 3 is a medial side view of the exemplary embodiment of an article of footwear including a knit sole system.

The following discussion and accompanying Figures disclose a variety of concepts relating to knitted components and the manufacture of knitted components. Although the knitted components may be utilized in a variety of products, an article of footwear that incorporates one of the knitted components is disclosed below as an example. The description will be directed in detail to an article of footwear. However, in addition to footwear, the knitted components may be utilized in other types of apparel (e.g., gloves or mittens) where the ability to securely grip an object may be enhanced by protuberances. Accordingly, the knitted components and other concepts disclosed herein may be incorporated into a variety of products for both personal and industrial purposes.

FIGS. 1 through 26 illustrate exemplary embodiments of an article of footwear having an upper and a knit sole system incorporating a knitted component and the associated method of manufacturing. The upper and knit sole system incorporate a knitted component that is vacuum-formed to produce a knit outsole having cleat members. The individual features of any of the knitted components described herein may be used in combination or may be provided separately in different configurations for articles of footwear. In addition, any of the features may be optional and may not be included in any one particular embodiment of a knitted component.

For consistency and convenience, directional adjectives are employed throughout this detailed description corresponding to the illustrated embodiments. The term "longitudinal" as used throughout this detailed description and in the claims refers to a direction extending a length or major axis of an article. In some cases, the longitudinal direction may extend from a forefoot region to a heel region of the article. Also, the term "lateral" as used throughout this detailed description and in the claims refers to a direction extending a width or minor axis of an article. In other words, the lateral direction may extend between a medial side and a lateral side of an article. Furthermore, the term "vertical" as used throughout this detailed description and in the claims refers to a direction generally perpendicular to a lateral and longitudinal direction. For example, in cases where an article is planted flat on a ground surface, the vertical direction may extend from the ground surface upward. It will be understood that each of these directional adjectives may be applied to individual components of an article, including an upper, a knitted component and portions thereof, and/or a sole system.

FIGS. 1 through 7 illustrate an exemplary embodiment of an article of footwear 100, also referred to simply as article 100. In some embodiments, article of footwear 100 may include a sole system 110 and an upper 120. Although article 100 is illustrated as having a general configuration suitable for enhanced traction, concepts associated with article 100 may also be applied to a variety of athletic footwear types, including soccer shoes, baseball shoes, basketball shoes, cycling shoes, football shoes, tennis shoes, training shoes, walking shoes, and hiking boots, for example. The concepts may also be applied to footwear types that are generally considered to be non-athletic, including dress shoes, loafers, sandals, and work boots. Accordingly, the concepts disclosed with respect to article 100 may be applied to a wide variety of footwear types.

For reference purposes, article 100 may be divided into three general regions: a forefoot region 101, a midfoot region 102, and a heel region 103. Forefoot region 101 generally includes portions of article 100 corresponding with the toes and the joints connecting the metatarsals with the phalanges. Midfoot region 102 generally includes portions of article 100 corresponding with an arch area of the foot. Heel region 103 generally corresponds with rear portions of the foot, including the calcaneus bone. Article 100 also includes a lateral side 104 and a medial side 105, which extend through each of forefoot region 101, midfoot region 102, and heel region 103 and correspond with opposite sides of article 100. More particularly, lateral side 104 corresponds with an outside area of the foot (i.e., the surface that faces away from the other foot), and medial side 105 corresponds with an inside area of the foot (i.e., the surface that faces toward the other foot). Forefoot region 101, midfoot region 102, heel region 103, lateral side 104, and medial side 105 are not intended to demarcate precise areas of article 100. Rather, forefoot region 101, midfoot region 102, heel region 103, lateral side 104, and medial side 105 are intended to represent general areas of footwear 100 to aid in the following discussion. In addition to article 100, forefoot region 101, midfoot region 102, heel region 103, lateral side 104, and medial side 105 may also be applied to sole system 110, upper 120, and individual elements thereof.

In some embodiments, article 100 may include sole system 110 and upper 120 that are formed from portions of a knitted component incorporated into article 100. The sole system 110 and upper 120 may be formed of unitary knit construction from a knitted component so as to form a one-piece element that includes sole system 110 and upper 120. A portion of the knitted component may form a knit outsole of sole system 110 and another portion of the knitted component may form the majority of upper 120.

In some embodiments, sole system 110 is secured to upper 120 and extends between the foot and the ground when article 100 is worn. In an exemplary embodiment, the primary element of sole system 110 is a knitted component lower portion 111 that forms a knit outsole 112 through a vacuum forming process, as further detailed below. Knit outsole 112 includes an outsole top surface or side 113 (see FIG. 5), an outsole bottom surface or side 114. In some embodiments, sole system 110 may include one or more protuberances or projections that may assist with providing traction to article 100. In one embodiment, knit outsole 112 includes a plurality of ground-engaging cleat members 115 that extend outward from outsole bottom surface 114 in the vertical direction towards a ground surface.

Figure 4:
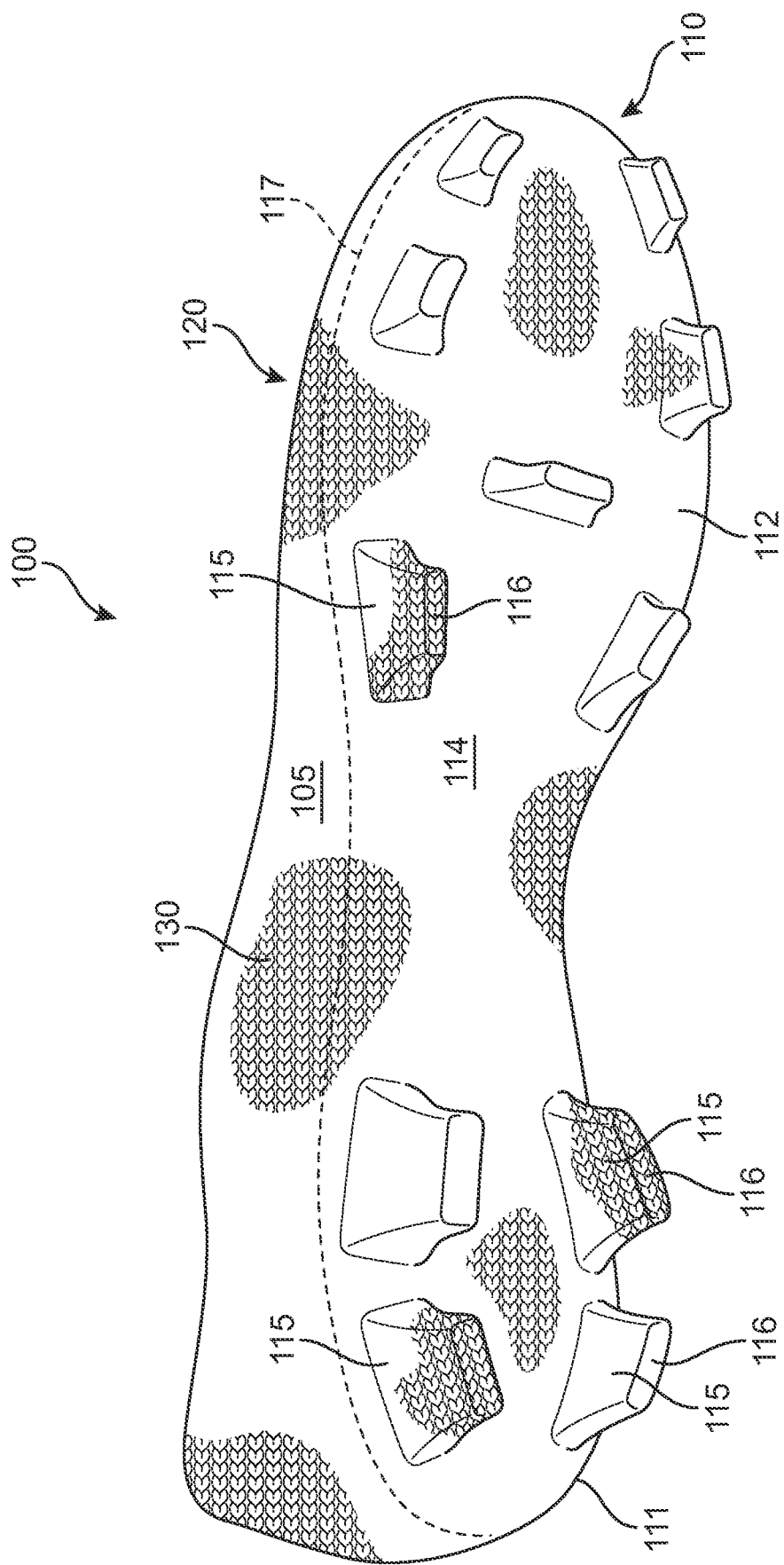
FIG. 4 is an underside view of the exemplary embodiment of an article of footwear including a knit sole system.

Knitted component lower portion 111 forming knit outsole 112 is of unitary knit construction with the lower areas of upper 120. In one embodiment, knit outsole 112 and upper 120 may be formed from different portions of a single one-piece knitted component. Outsole top surface or side 113 is located on the top surface of knit outsole 112, and is positioned to extend under a lower surface of the foot. Outsole bottom surface or side 114 comprises the outer bottom ground-facing surface of sole system 110 and the bottom surface of article of footwear 100. Referring now to FIG. 4, outsole bottom surface or side 114 faces away from the foot, and may be ground-engaging if, for example, ground-engaging cleat member 115 becomes embedded in the ground. Ground-engaging cleat members 115 protrude from outsole bottom surface 114 and include a cleat face 116 at a distal end that is oriented approximately parallel to outsole bottom surface 114. In one embodiment cleat face 116 may be a knit surface of a portion of knitted component lower portion 111 that has been vacuum formed to produce cleat members 115.

With this configuration, cleat face 116 of ground-engaging cleat member 115 engages the ground first. Although this configuration for sole system 110 provides an example of a sole system that may be used in connection with upper 120, a variety of other conventional or nonconventional configurations for sole system 110 may also be used. Accordingly, the features of sole system 110 or any sole system utilized with upper 120 may vary considerably.

Upper 120 defines a void within article 100 for receiving and securing a foot relative to sole system 110. The void is shaped to accommodate the foot and extends along a lateral side of the foot, along a medial side of the foot, over the foot, around the heel, and under the foot. Access to the void is provided by an ankle opening 121 located in at least heel region 103. In further configurations, upper 120 may include additional elements, such as (a) a heel counter in heel region 103 that enhances stability, (b) a toe guard in forefoot region 101 that is formed of a wear-resistant material, (c) a collar extending around ankle opening 121, and (d) logos, trademarks, and placards with care instructions and material information.

Many conventional footwear uppers are formed from multiple material elements (e.g., textiles, polymer foam, polymer sheets, leather, and synthetic leather) that are joined through stitching or bonding, for example. In contrast, in embodiments of the disclosure, a majority of upper 120 may be formed from a knitted component upper portion 130, which extends through each of forefoot region 101, midfoot region 102, and heel region 103 along both lateral side 104 (shown in FIG. 3) and medial side 105 (shown in FIG. 2), over forefoot region 101, and around heel region 103. In addition, knitted component upper portion 130 forms portions of both an exterior surface and an opposite interior surface of upper 120. As such, knitted component upper portion 130 defines at least a portion of the void within upper 120.

In some embodiments, article of footwear 100 may be formed from a one-piece knitted component that includes knitted component lower portion 111, forming knit outsole 112 of sole system 110, and knitted component upper portion 130, forming the majority of upper 120. Thus, the upper and the outsole may comprise a textile knitted together as a one-piece knit element. Forming an article of footwear as a one piece knit textile element through knitting provides significant advantages over typical articles of footwear. For example, there is no need to attach a separate outsole to an upper, thus significantly reducing the number of steps required for assembly and, therefore, the possibility of assembly errors. Also, there are no joints between the outsole and the upper at which disparate properties and characteristics of the joined materials may cause excessive wear and premature failure.

In some embodiments, upper 120 and sole system 110 are formed by a single knitted component, including knitted component lower portion 111 and knitted component upper portion 130. FIG. 1 through FIG. 7 illustrate such an embodiment, wherein upper 120 and sole system 110 comprise a single knitted component. In these embodiments, knitted component upper portion 130 and knitted component lower portion 111 of sole system 110 are formed of unitary knit construction so as to be a one-piece knit element. Boundary 117 depicts an area of demarcation between upper 120 and sole system 110. However, for embodiments of article 100 including upper 120 and sole system 110 formed from a single knitted component that encloses the foot and includes knit outsole 112, boundary 117 may not be actually physically present or visible on article 100. That is, boundary 117 may represent an imaginary dividing line between the portions of the single knitted component that form each of upper 120 and sole system 110 and no indicia corresponding to boundary 117 may be present. In other embodiments, boundary 117 may represent a transition between types of yarns used to form each of knitted component lower portion 111 and knitted component upper portion 130.

In various embodiments, the single knitted component incorporating into article 100, including each of knitted component lower portion 111 and knitted component upper portion 130, may incorporate various types of yarn that impart different properties to separate areas of upper 120 and/or sole system 110. For example, one area or portion of knitted component upper portion 130 may be formed from a first type of yarn that imparts a first set of properties, and another area or portion of first knitted component upper portion 130 may be formed from a second type of yarn that imparts a second set of properties. In this configuration, properties may vary throughout upper 120 by selecting specific yarns for different areas of knitted component 130. Similarly, knitted component lower portion 111 of sole system 110 may be knitted from various yarns, including any of the yarns used to form knitted component upper portion 130. With this configuration, different yarns may be used to impart different properties to each of knitted component lower portion 111 and knitted component upper portion 130, as well as to different areas within each of knitted component lower portion 111 and knitted component upper portion 130.

Yarns used in embodiments of the disclosure may be selected from monofilament yarns and multifilament yarns formed from natural or synthetic materials. Multifilament yarns may be twisted or untwisted. In some embodiments, yarn may be elastic or essentially inelastic. In some embodiments, yarn may be textured or have a natural finish. Natural materials may be selected from staple materials, such as silk, cotton, and wool. Synthetic materials may be selected from polymers that can be formed into filaments. Synthetic materials include but are not limited to polyesters; polyamides, such as any of the various types of homopolymeric and co-polymeric nylon; aramides, such as Kevlar® KEVLAR® and Nomex® NOMEX®; and urethanes, such as thermoplastic polyurethane. Fusible yarns also may be suitable for some embodiments.

In embodiments of the disclosure, the yarn used to form the article of footwear may incorporate yarns with different deniers, materials (e.g., cotton, elastane, polyester, rayon, wool, and nylon), and degrees of twist, for example. The different types of yarns may affect the physical properties of a knitted component, including aesthetics, stretch, thickness, air permeability, and abrasion-resistance. In some configurations, multiple yarns with different colors may be utilized to form the knitted component. When yarns with different colors are twisted together and then knitted, the knitted component may have a heathered appearance with multiple colors randomly distributed throughout.

In some embodiments, sole system 110 may be provided with additional components configured to provide support and stability to knit outsole 112. In an exemplary embodiment, sole system 110 may include an insert member 300 that is configured to be placed in relationship with knit outsole 112 from an interior of article 100. Insert member 300 may fill and provide structural support and/or rigidity for cleat members 115.

Figure 5:
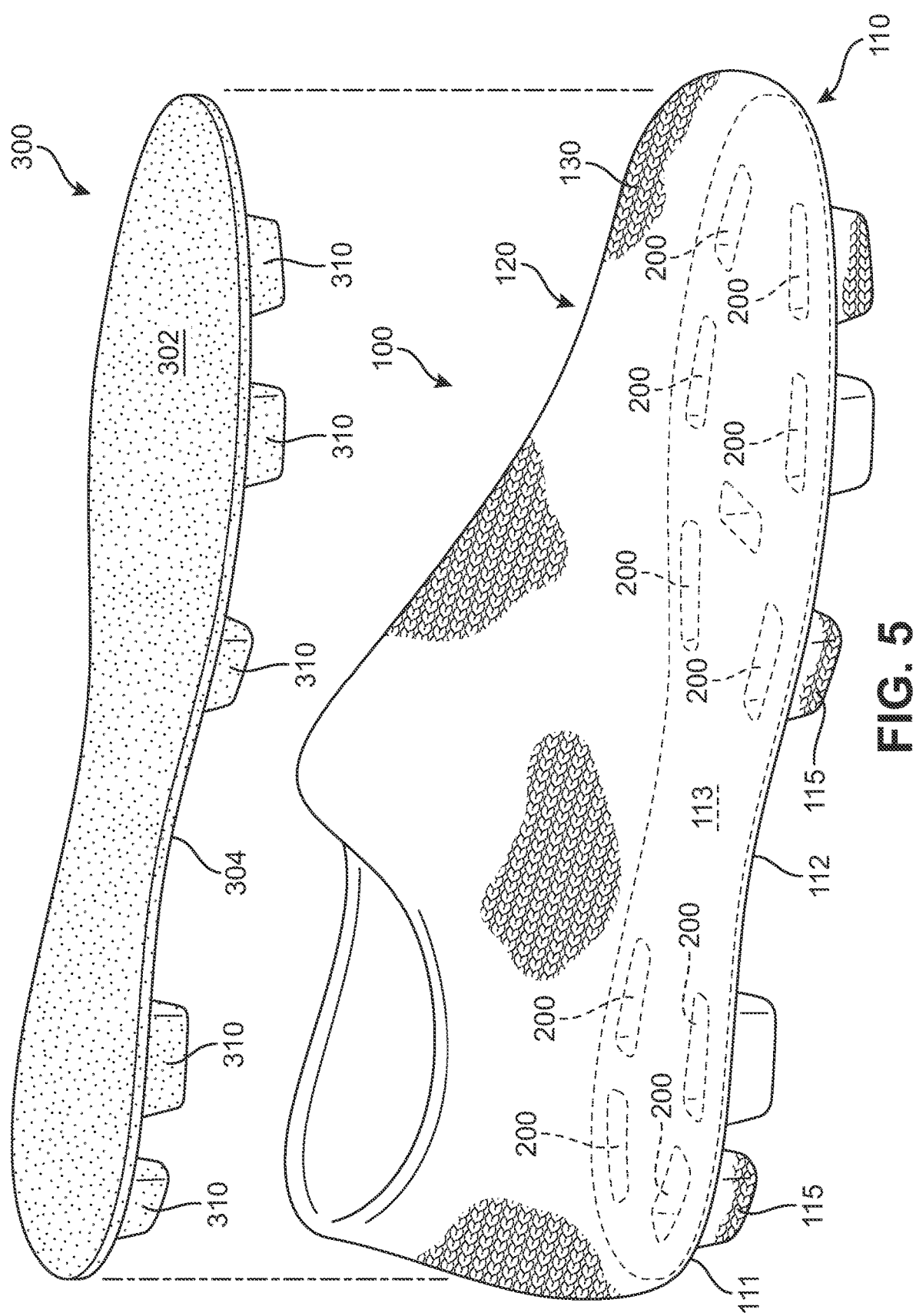
FIG. 5 is an exploded view of the exemplary embodiment of an article of footwear including a knit sole system with an insert member.

FIG. 5 illustrates an exemplary embodiment of insert member 300 shown in an exploded view positioned above article 100. Insert member 300 may be placed in relationship with knit outsole 112 to form sole system 110. Insert member 300 is disposed below a foot of wearer when placed within article 100 and includes a top side 302 that faces towards the foot and an opposite bottom side 304 that faces away from the foot. In some embodiments, knit outsole 112 includes a plurality of cavities 200 in outsole top surface 113 that correspond with and form cleat members 115. In this embodiment, cavities 200 forming cleat members 115 in knit outsole 112 may be hollow.

In an exemplary embodiment, insert member 300 may further include a plurality of protuberances 310 that extend away from bottom side 304 in a vertical direction. Protuberances 310 may be configured and designed so as to correspond with and fit within cavities 200 of knit outsole 112 to reinforce and provide support and/or rigidity to cleat members 115. In one embodiment, the location, size, and arrangement of protuberances 310 on insert member 300 may be substantially similar and correspond with the location, size, and arrangement of cavities 200 on outsole top surface 113 forming cleat members 115. For example, in exemplary embodiments, an article of footwear may include between 5 and 15 protuberances 310 that are associated with between 5 and 15 cleat members 115 (such as 11 protuberances 310 and 11 cleat members 115 as depicted in FIG. 5). With this arrangement, protuberances 310 on bottom side 304 are aligned with cavities 200 on outsole top surface 113 so that when insert member 300 is placed in relationship with knit outsole 112 within the interior of article 100, protuberances 310 substantially fill cavities 200 and provide reinforcement to cleat members 115. Additionally, insert member 300 may have an outer peripheral edge defining a shape of insert member 300 that is configured and designed to fit within the interior of upper 120 of article 100.

Figure 6:
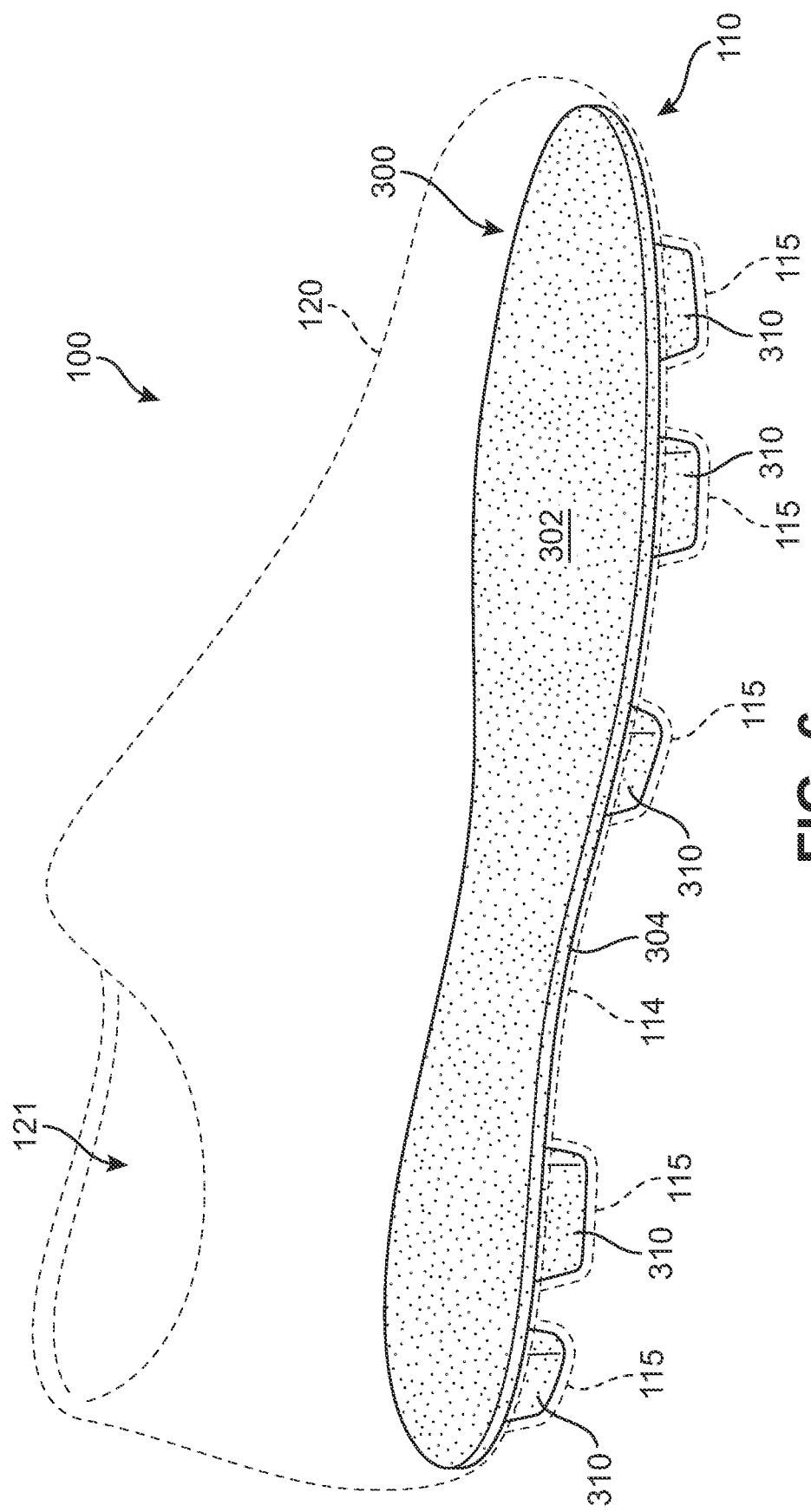
FIG. 6 is a schematic view of the exemplary embodiment of an article of footwear upper shown in phantom with an insert member disposed within the knit sole system.

Referring now to FIG. 6, insert member 300 having protuberances 310 extending from bottom side 304 is shown in relationship with knit outsole 112. In this embodiment, knitted component upper portion 130 and knitted component lower portion 111 are shown in phantom view to illustrate the relationship of insert member 300 within knit outsole 112. As seen in FIG. 6, when insert member 300 is located within the interior of upper 120 of article 100 so that bottom side 304 is facing outsole top surface 113, protuberances 310 are aligned with and fill cavities 200 of corresponding cleat members 115.

Figure 7:
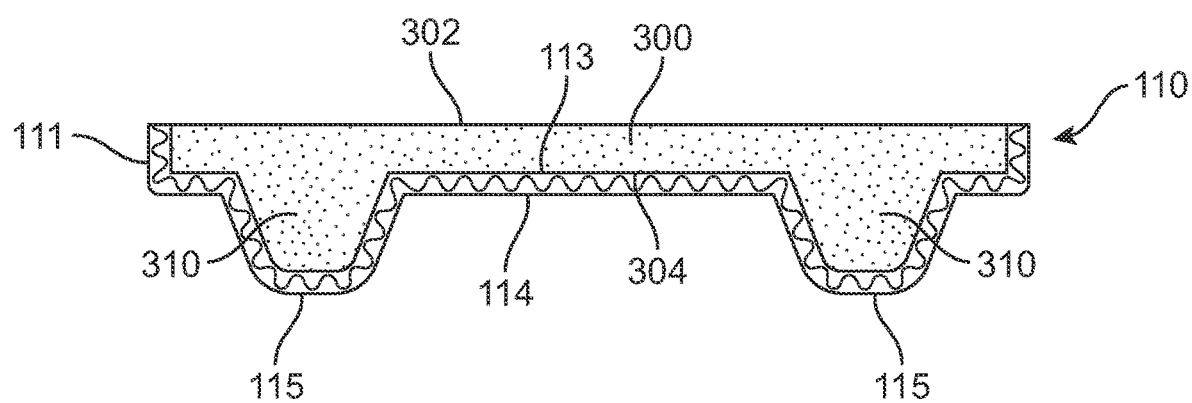
FIG. 7 is a cross-sectional view of the exemplary embodiment of an article of footwear including a knit sole system with an insert member.

In some embodiments, insert member 300 is placed or affixed to outsole top surface 113 of knit outsole 112. A cross-sectional view shown in FIG. 7, illustrates insert member 300 in place on outsole top surface 113 of knit outsole 112. Protuberances 310 are located within and substantially fill cavities 200 to reinforce cleat members 115. Top side 302 of insert member 300 may be the foot-contacting surface and bottom side 304 faces the opposite direction towards outsole top surface 113. Outsole bottom surface 114 includes the ground-engaging cleat members 115 that are facing downward in a vertical direction away from outsole bottom surface 114. Cleat face 116 of cleat members 115 is a knit surface that may be directly in contact with the ground when article 100 is worn. Other surfaces of knit outsole 112, such as portions of outsole bottom surface 114, also may be at least partially directly in contact with the ground when article 100 is worn.

With this configuration, insert member 300 fills and provides support to cleat members 115. Insert member 300 is disposed below a foot of a wearer of article 100 and, in some embodiments, may be configured as a midsole element. That is in some embodiments, additional inserts may be provided within the interior of upper 120, such as an insole element, to provide further cushioning to a foot of a wearer. In other embodiments, insert member 300 may be used within upper 120 without any additional inserts or elements. In this way, insert member 300 can serve as both a reinforcing member for knit outsole 112 and as a cushioning or padding material for a foot of a wearer.

In various embodiments, insert member 300 may be formed from a variety of different materials. Materials for forming insert member 300 may include any suitable reinforcing material. Reinforcing materials may include compositions that provide minimal support. Such compositions may be used to tune a cushioning response. More typically, however, a reinforcing material may be selected for its rigidity and strength. The material may be foamed material, such as foamed plastic materials. For example, foamed thermoplastic polyurethane may be suitable. The density of foamed materials may be controlled to tune cushioning response. Higher density may give a more supportive response and better reinforcement of ground-engaging cleat members.

In some embodiments, insert member 300 may be monolithic or may have zones that provide additional support or resistance to twisting, for example. For example, in some embodiments, a material having a greater rigidity may be used to form protuberances 310 of insert member 300 and a material having a lesser rigidity may be used to form remaining portions of insert member 300. In some cases, portions or the entirety of insert member 300 may comprise foamed thermoplastic material. In other cases, one or more portions of insert member 300 may be formed from different materials. For example, in one embodiment, insert member 300 may comprise a zone of low-density foam, a zone of high-density foam, and a zone of unfoamed material.

In some embodiments, an insert member disposed within the interior of upper 120 may be used during the manufacturing of an article 100 to form the shape of a knit outsole, including one or more cleat members disposed on the knit outsole. FIGS. 8 through 17 illustrate an exemplary process of vacuum forming a knitted component using an insert member to form a knit outsole. In an exemplary embodiment, insert member 300 may be used during the manufacturing of article 100 to form the shape of knit outsole 112, including plurality of cleat members 115 corresponding to the shape of protuberances 310 of insert member 300. In one embodiment, a vacuum forming process may be used to shape knitted component lower portion 111 around insert member 300 within upper 120 to form knit outsole 112.

Thus, embodiments of the disclosure provide a method of manufacturing an article of footwear with a sole system having a knit outsole. In accordance with the method, a one-piece knitted component is knitted to include a portion that is vacuum formed around an insert member to produce the knit outsole. A ground-engaging cleat member is formed in the ground-facing side of the knit outsole by vacuum forming the portion of the knitted component around the insert member having a protuberance extending away from a bottom side of the insert member. The vacuum formed cleat member may have a ground-engaging face comprising a knitted surface that engages the ground and may provide traction.

Figure 8:
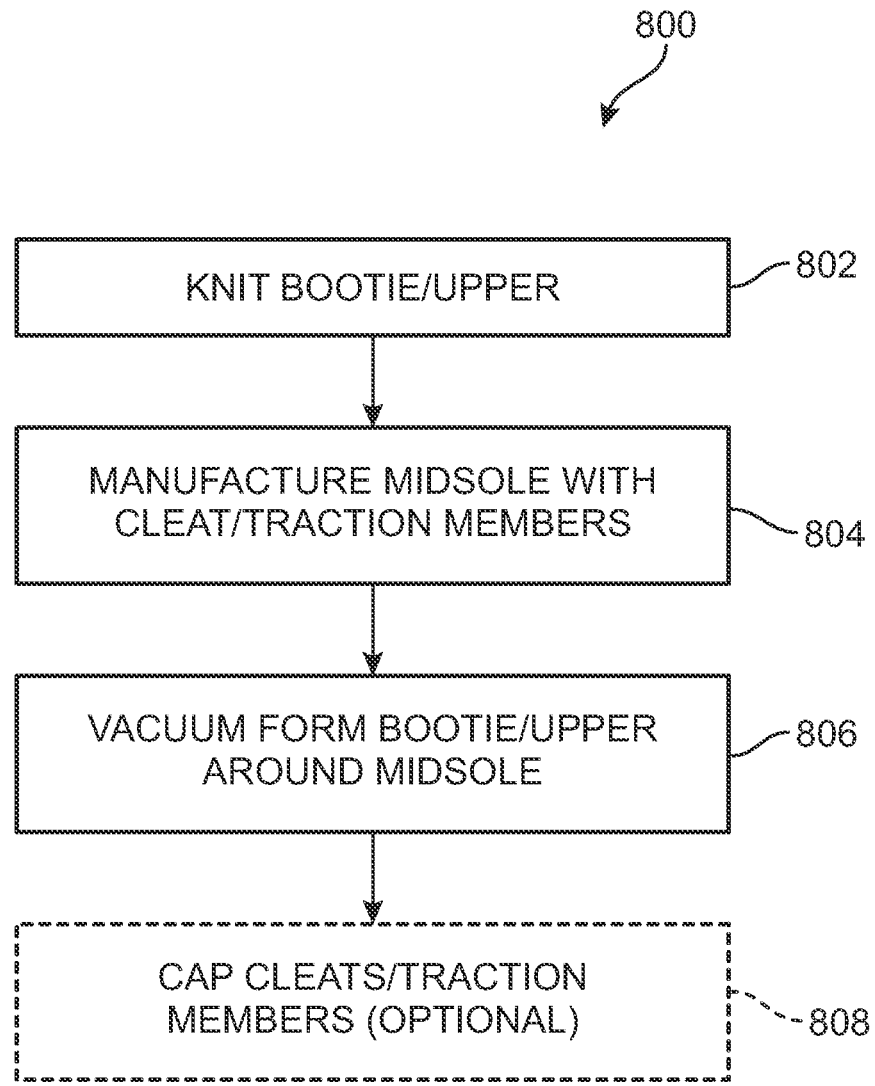
FIG. 8 is a schematic flowchart of an exemplary process for manufacturing an article of footwear including a knit sole system.

Referring now to FIG. 8, an exemplary process 800 for manufacturing an article of footwear including a knit sole system is illustrated. In one embodiment, process 800 may include one or more steps that may be repeated to form a completed article of footwear with a knit sole system. The order of the steps is exemplary, and in other embodiments, additional or different steps not shown in FIG. 8 may be included to produce an article of footwear having a knit sole system. In an initial step 802, a knitted component configured to be incorporated into the upper of the article of footwear is knit. In an exemplary embodiment, the knitted component may be knit in the configuration of a bootie, including an upper portion for extending around and covering over the top of the foot of a wearer, as well as a lower portion for extending underneath the foot of the wearer. With this configuration, the knitted component may be knit as a bootie that is a one-piece element formed of unitary knit construction that encloses the foot of a wearer.

In one embodiment, step 802 may include knitting a knitted component, including portions of a knitted component substantially similar to knitted component lower portion 111 and knitted component upper portion 130, to form a foot-enclosing knit bootie. Although knitting may be performed by hand, the commercial manufacture of knitted components is generally performed by knitting machines. An example of a knitting machine suitable for producing a knitted component includes a knitting machine having a configuration of a V-bed flat knitting machine for purposes of example, but any of the knitted components described herein may be produced on other knitting machines. The disclosure also is described in detail as it relates to knitted textiles formed by weft knitting, but textiles formed by any suitable knitting process, including but not limited to: weft knitting processes, for example, flat knitting operations or circular knitting operations; warp knitting process; or any other knitting process suitable for providing a knitted textile, may be used. In such embodiments, suitable knitting machines, for example, circular knitting machines or warp knitting machines may be used to form a foot-enclosing knit bootie of unitary knit construction at step 802.

Knitted component 111, knitted component 130, and other embodiments of foot-enclosing booties can be formed of unitary knit construction. As used herein, the term "unitary knit construction" means that the respective component is formed as a one-piece element through a knitting process. That is, the knitting process substantially forms the various features and structures of unitary knit construction without the need for significant additional manufacturing steps or processes. A unitary knit construction may be used to form a knitted component having structures or elements that include, in the case of weft knitting, one or more courses of yarn or other knit material that are joined such that the structures or elements include at least one course in common (i.e., sharing a common yarn) and/or include courses that are substantially continuous between each of the structures or elements, or that include, in the case of warp knitting, one or more wales of yarn or other knit material that are joined such that the structures or elements include at least one wale in common (i.e., sharing a common yarn) and/or wales that are substantially continuous between each of the structures or elements. With this arrangement, a one-piece element of unitary knit construction is provided.

Examples of various configurations of knitted components and methods for forming knitted components with unitary knit construction are disclosed in U.S. Pat. No. 6,931,762 to Dua; U.S. Pat. No. 7,347,011 to Dua, et al.; U.S. Patent Application Publication 2008/0110048 to Dua, et al.; U.S. Patent Application Publication 2010/0154256 to Dua; and U.S. Patent Application Publication 2012/0233882 to Huffa, et al.; each of which is incorporated herein by reference in its entirety. Knitted component lower portion 111, knitted component upper portion 130, and other embodiments of foot-enclosing knit booties remain formed of unitary knit construction when other elements, such as logos, trademarks, placards with care instructions or other information, such as material information and size, tensile or structural elements, are added following the knitting procedure.

In some embodiments, a knitted component for forming a knit sole system may include areas knit using durable yarns and/or fusible yarns. Durable yarns and/or fusible yarns typically may provide the wear resistance users likely will prefer to have in ground-engaging areas and areas of the knit sole system that are likely to experience greater wear. For example, the outer surface of the knit sole system comprises a knitted textile, but is likely to experience greater wear because the surface faces the ground and is, at least in part, adjacent ground-engaging cleat members that are configured to be in contact with a ground surface. Further, fusible yarns may provide not only excellent wear resistance, but also support for the bottom of the foot when activated. Strands of fusible yarn may, when heated, fuse to form an impermeable mass and may also impart rigidity to the knitted component.

In an exemplary embodiment, cleat members 115 formed in knit outsole 112 may incorporate fusible yarns into knitted component lower portion 111 to impart rigidity to knit outsole 112. Fusible yarns incorporated into a knitted component may further assist with allowing the knit outsole to retain the shape of inert member used during the vacuum forming process 800 to shape the knit outsole. Fusible yarns also may provide a highly water resistant surface that helps keep the interior of the article of footwear free of water that otherwise would enter the article of footwear from the outside.

Next, at step 804, an insert member, including an insert member substantially similar to insert member 300, described above, may be manufactured. In one embodiment of step 804, the insert member may include a midsole, however, as noted above, in other embodiments, the insert member may be used with additional elements, for example, an insole element, or may be used alone and take the place of an insole element or other components. During step 804, the insert member may be manufactured with a plurality of protuberances that will be used to form the various cleat members or traction elements of the knit outsole.

After a suitable midsole insert member has been made at step 802 with the desired location, size, and arrangement of protuberances for forming cleat members on the knit outsole, the midsole insert member may be placed inside the foot-enclosing knit bootie. At step 806, the foot-enclosing knit bootie is vacuum formed around the foot-enclosing knit bootie to shape the knit outsole.

In some embodiments, an additional optional step 808 may be included in process 800 to provide protection to ground-engaging surfaces of the formed cleat members of the knit outsole. In this embodiment, step 808 includes a step of applying a cap element to the cleat member. As will be further described below, the cap element may provide protection to the knit surface of the cleat face, including cleat face 116, that engages the ground surface. The cap element may also be configured to provide enhanced traction to the knit outsole.

Figure 9:
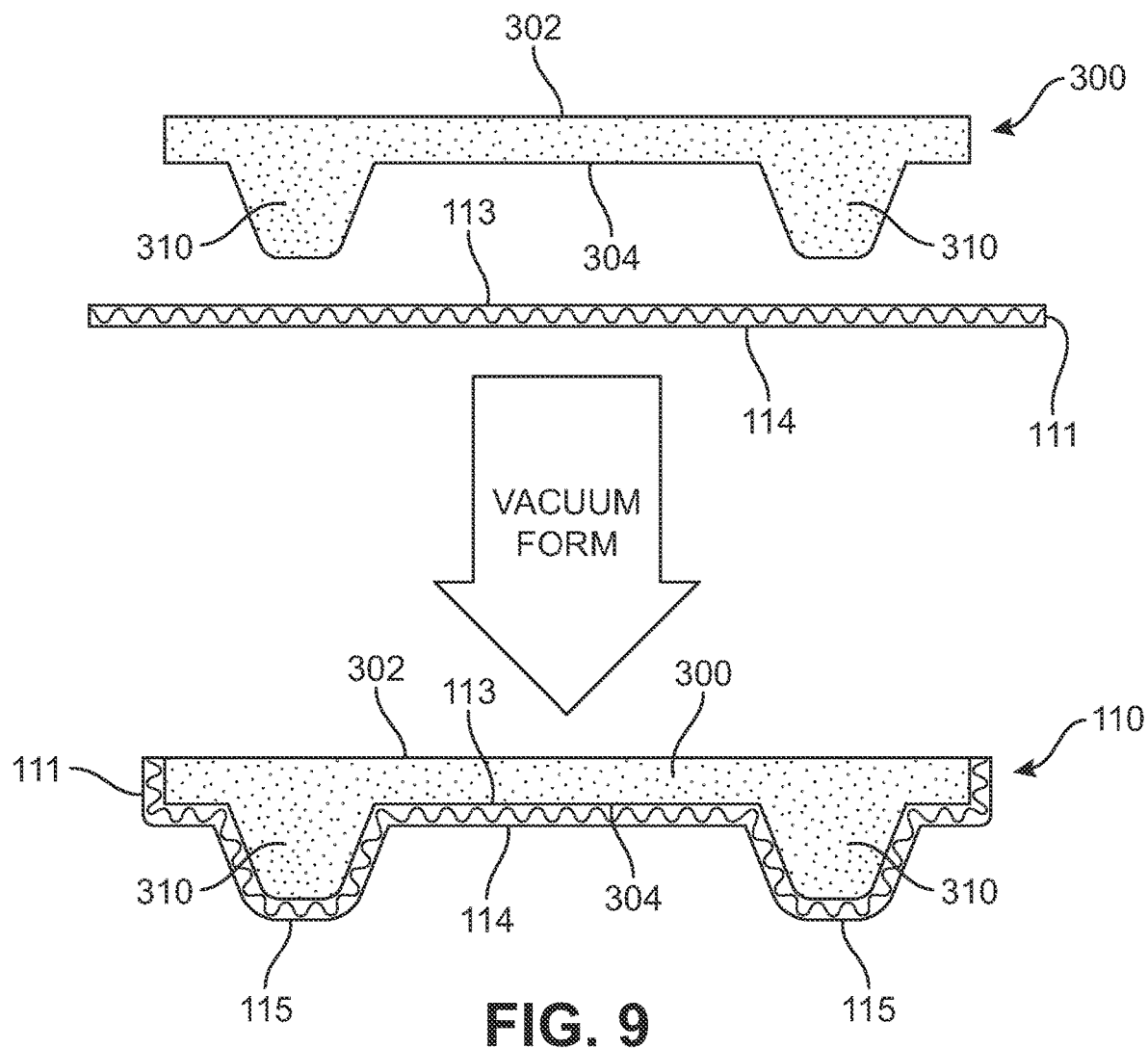
FIG. 9 is a representational view of an exemplary process of vacuum forming a knit sole system for an article of footwear incorporating a knitted component.

Referring now to FIG. 9, a representational view of step 806 of process 800 of vacuum forming a knit sole system for an article of footwear incorporating a knitted component is illustrated. As shown in this embodiment, knitted component lower portion 111 is vacuum formed around insert member 300 to form knit outsole 112. In an exemplary embodiment, bottom side 304 of insert member 300 includes protuberances 310 that will be used to form cavities 200 of cleat members 115 on knit outsole 112. In this embodiment, bottom side 304 of insert member 300 is brought in relation with outsole top surface 113 of knitted component lower portion 111.

Once insert member 300 and knitted component lower portion 111 are brought in relation with each other, a vacuum forming process may be applied to shape knitted component lower portion 111 around bottom side 304 of insert member 300, including the shape of protuberances 310. Once vacuum formed, knitted component lower portion 111 forms knit outsole 112, including cleat members 115 extending from outsole bottom surface 114.

In some embodiments, fusible yarn may be knitted in this area, for example, at least on portions of knitted component 111 aligned with and corresponding to protuberances 310 for forming ground-engaging cleat members 115. Fusible yarn may be optionally heated at step 806 to soften the outer surfaces of the yarn to assist with conforming to the shape of insert member 300 and protuberances 310. Upon cooling, fusible yarn may also provide additional rigidity and assist with retaining the shape of cleat member 115. Alternatively, a stiffening resin or plastic may be applied and activated and cured or heated at step 806 to assist with rigidity and/or shape retention.

FIGS. 10 through 17 illustrate various steps of the process of vacuum forming described generally with reference to step 806 of process 800. In this process, additional or different steps may be performed during the vacuum forming process without detracting from the principles of the exemplary process described herein.

Figure 10:
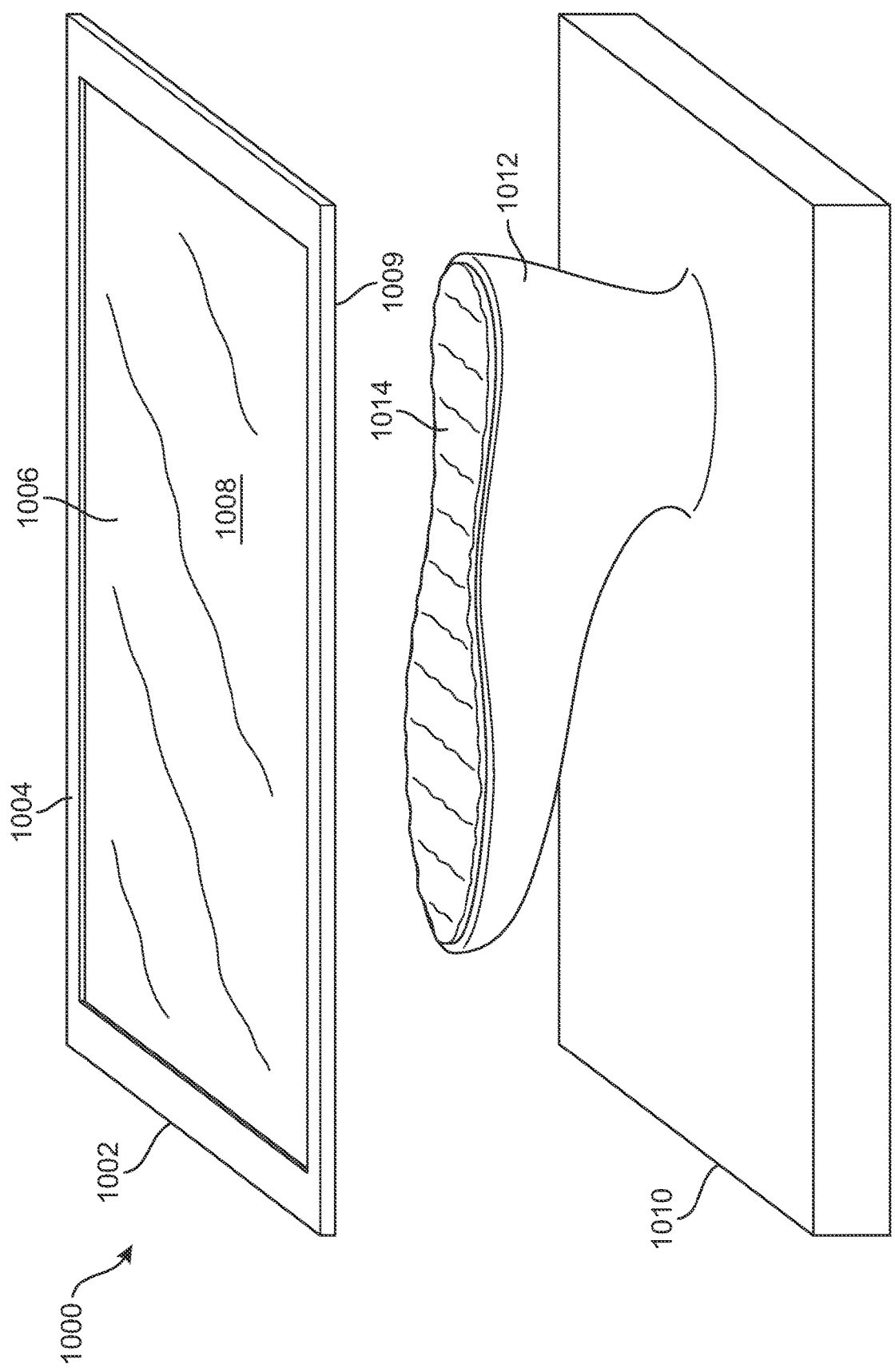
FIG. 10 is a representational view of a vacuum press for vacuum forming a knit sole system.

Referring now to FIG. 10, an exemplary embodiment of a vacuum press 1000 suitable for performing the vacuum forming process is illustrated. In this embodiment, vacuum press 1000 includes a moveable portion 1002 and a base portion 1010. Moveable portion 1002 is configured to move between an open and closed position in relation with base portion 1010 and allows an article to be placed on base portion 1010 for the vacuum forming process. In other embodiments, however, other configurations of a vacuum press with a different arrangement or different components, may be used.

In an exemplary embodiment, moveable portion 1002 of vacuum press 1000 includes a support 1004 surrounding and holding in place a flexible membrane 1006. In some cases, flexible membrane 1006 may be any suitable flexible material, including, for example, silicone or rubber. In other cases, different flexible materials may be used. In addition, in some embodiments where heat is applied during the vacuum forming process, flexible membrane 1006 may further include heating elements or other mechanisms for providing heat to flexible membrane 1006. In this embodiment, flexible membrane 1006 includes an outside surface 1008 and an opposite inside surface 1009. Inside surface 1009 is configured to contact an article during the vacuum forming process and faces downward towards base portion 1010 of vacuum press 1000.

In some embodiments, base portion 1010 may include features configured to assist with holding an article in place in vacuum press 1000 during the vacuum forming process. In an exemplary embodiment, where an article of footwear, for example, article 100, is being vacuum formed, base portion 1010 may include a last 1012 that is configured to receive an upper or bootie of an article of footwear. In this embodiment, last 1012 is arranged with a bottom surface 1014 oriented in an upwards direction away from base portion 1010 and facing towards inside surface 1009 of flexible membrane 1006. With this arrangement, a bottom portion of an upper or bootie that is configured to extend under the foot of a wearer can be placed on bottom surface 1014 of last 1012 to assist with forming the knit outsole.

Figure 11:
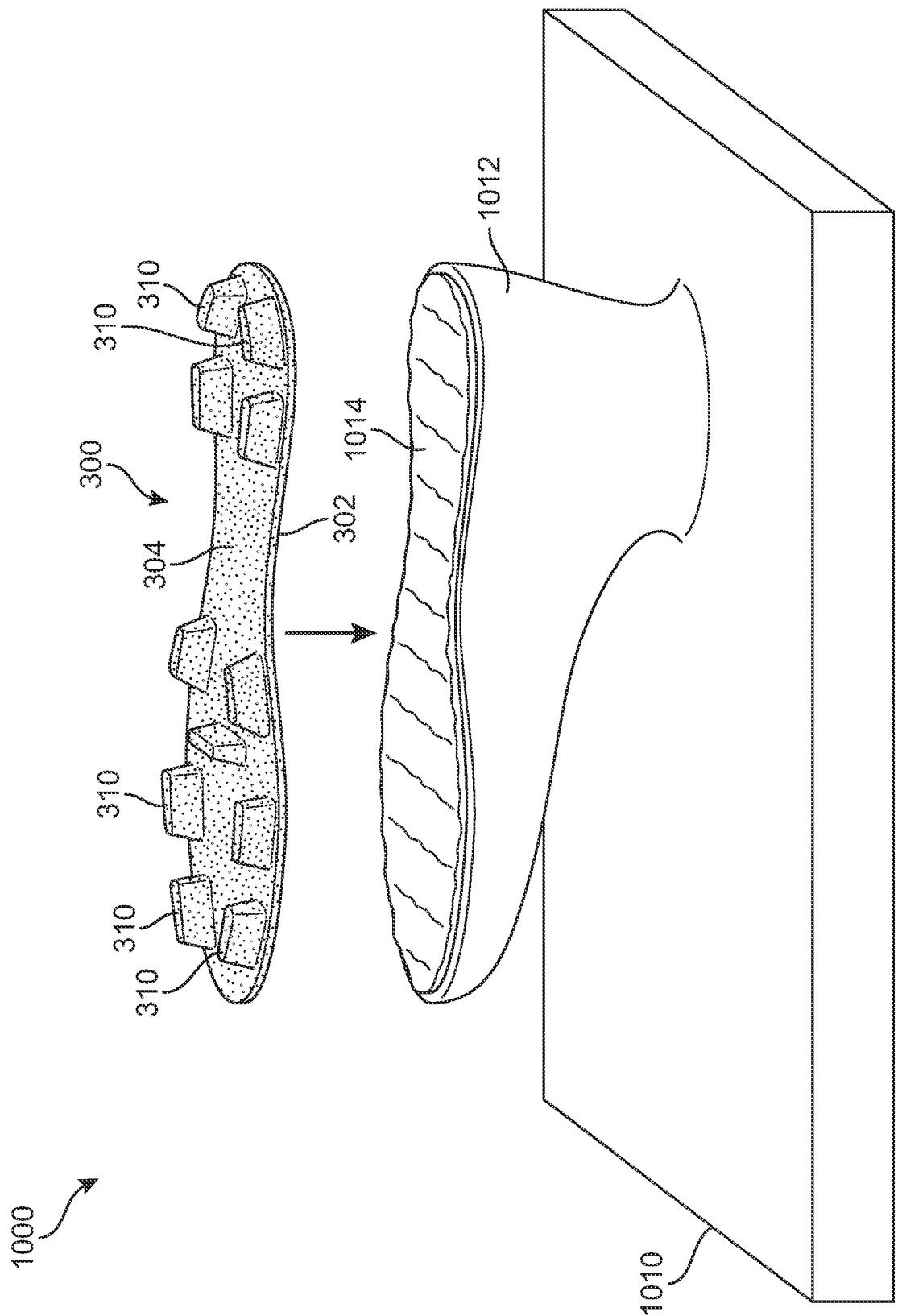
FIG. 11 is a representational view of a vacuum press including a last with an insert member for vacuum forming a knit sole system.

Referring now to FIG. 11, insert member 300 is shown being placed onto bottom surface 1014 of last 1012 in preparation of vacuum forming the knit outsole using vacuum press 1000. As shown in this embodiment, top side 302 of insert member 300 is placed onto bottom surface 1014 of last 1012 such that bottom side 304 of insert member 300 that includes protuberances 310 is facing upwards away from base portion 1010 of vacuum press 1000. With this arrangement, last 1012 may be ready to receive an upper or bootie of an article of footwear for the vacuum forming process of a knit outsole.

Figure 12:
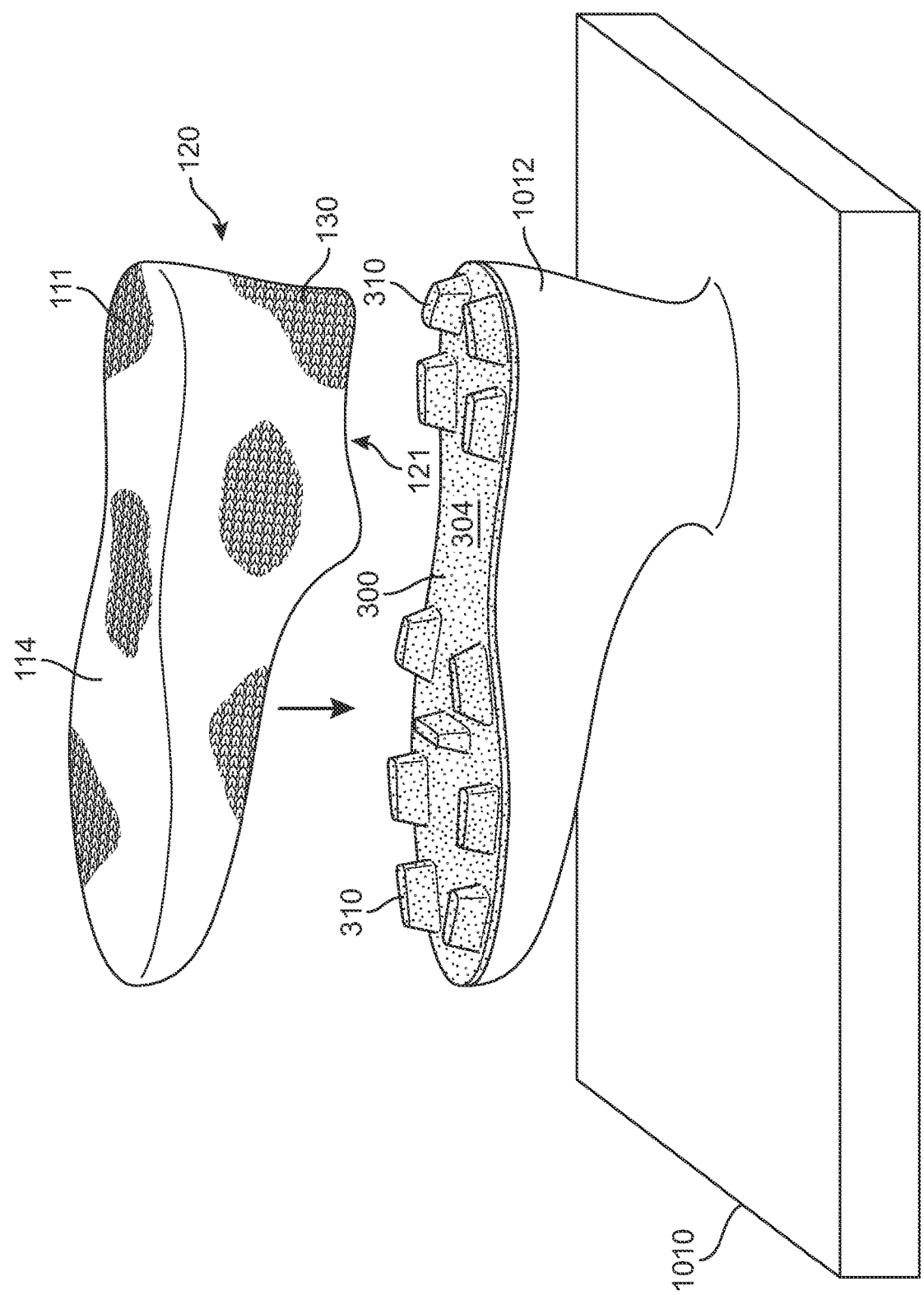
FIG. 12 is a representational view of a vacuum press having a knitted component being placed over the last for vacuum forming a knit sole system.

Next, as shown in FIG. 12, upper 120 that includes knitted component upper portion 130 and knitted component lower portion 111 formed of unitary knit construction so to form a one-piece foot-enclosing bootie is prepared for the vacuum forming process. In an exemplary embodiment, upper 120 is placed in an inverted position over last 1012 having insert member 300 disposed on bottom surface 1014, as described above in reference to FIG. 11. In one embodiment, ankle opening 121 may facilitate placement of upper 120 over last 1012 such that insert member 300 may be located within the interior of upper 120.

Figure 13:
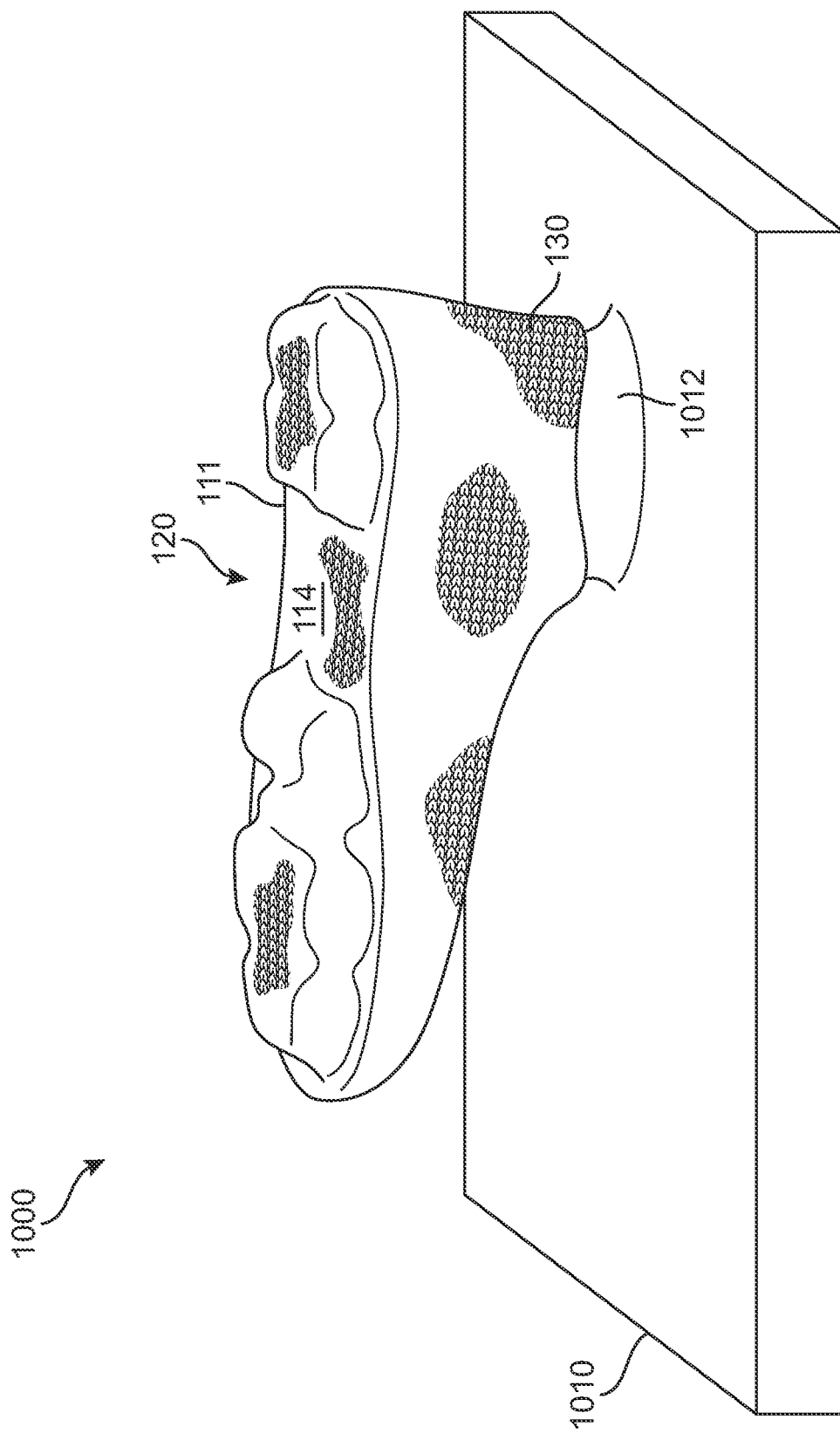
FIG. 13 is a representational view of a knitted component disposed in a last in a vacuum press for vacuum forming a knit sole system.

Referring now to FIG. 13, upper 120 has been placed over last 1012 having insert member 300 disposed on bottom surface 1014. In this configuration, bottom side 304 of insert member 300 that includes protuberances 310 is placed in loose relation with outsole top surface or side 113 within the interior of upper 120. Outsole bottom surface or side 114 of knitted component lower portion 111 faces outwards away from base portion 1010 of vacuum press 1000. As shown in FIG. 13, protuberances 310 on insert member 300 may form loose mounds or lumps in outsole bottom surface 114 of knitted component lower portion 111 prior to the application of the vacuum forming step.

Figure 14:
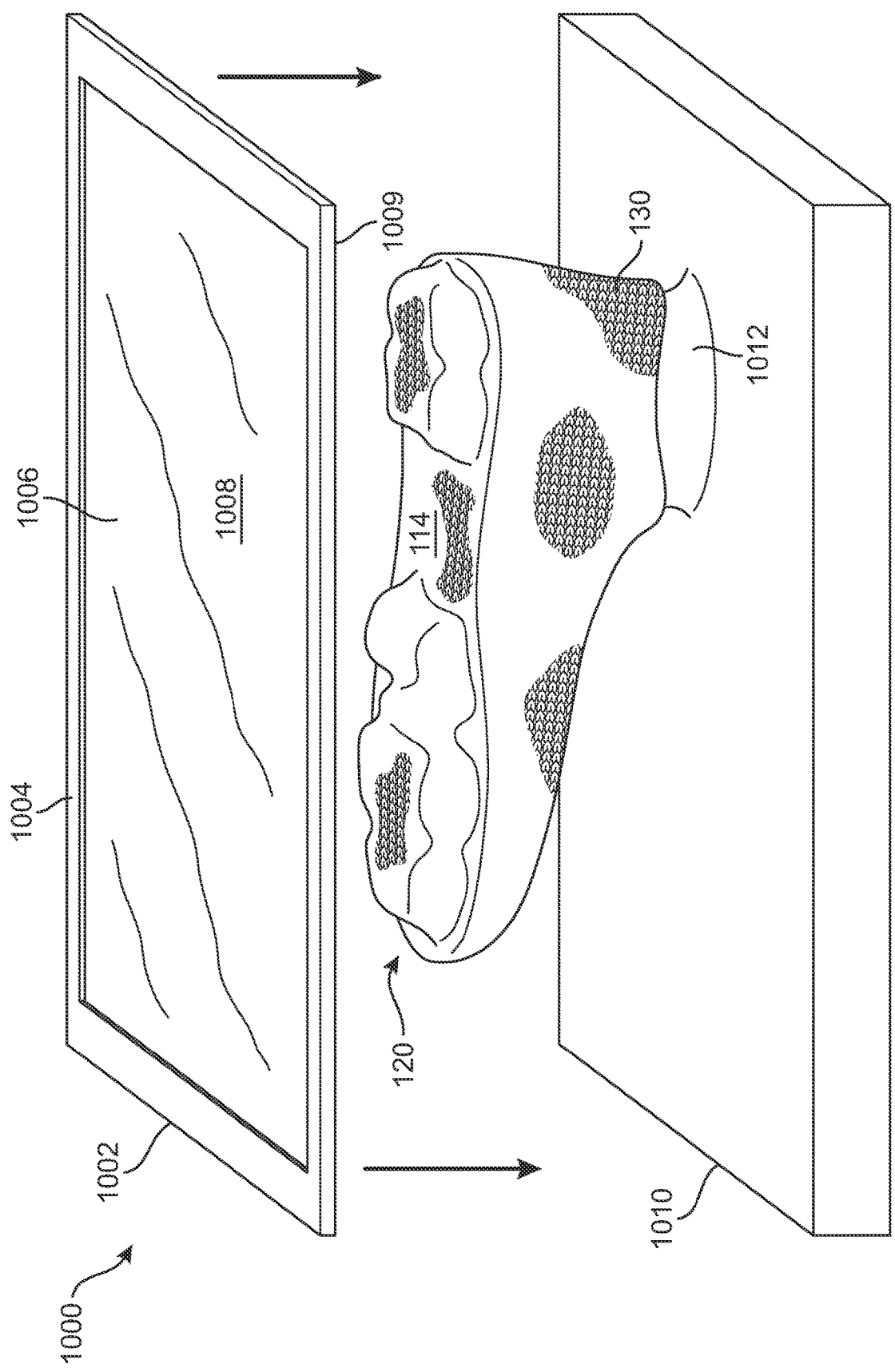
FIG. 14 is a representational view of a vacuum press closing over a last having the knitted component for vacuum forming a knit sole system.
Figure 15:
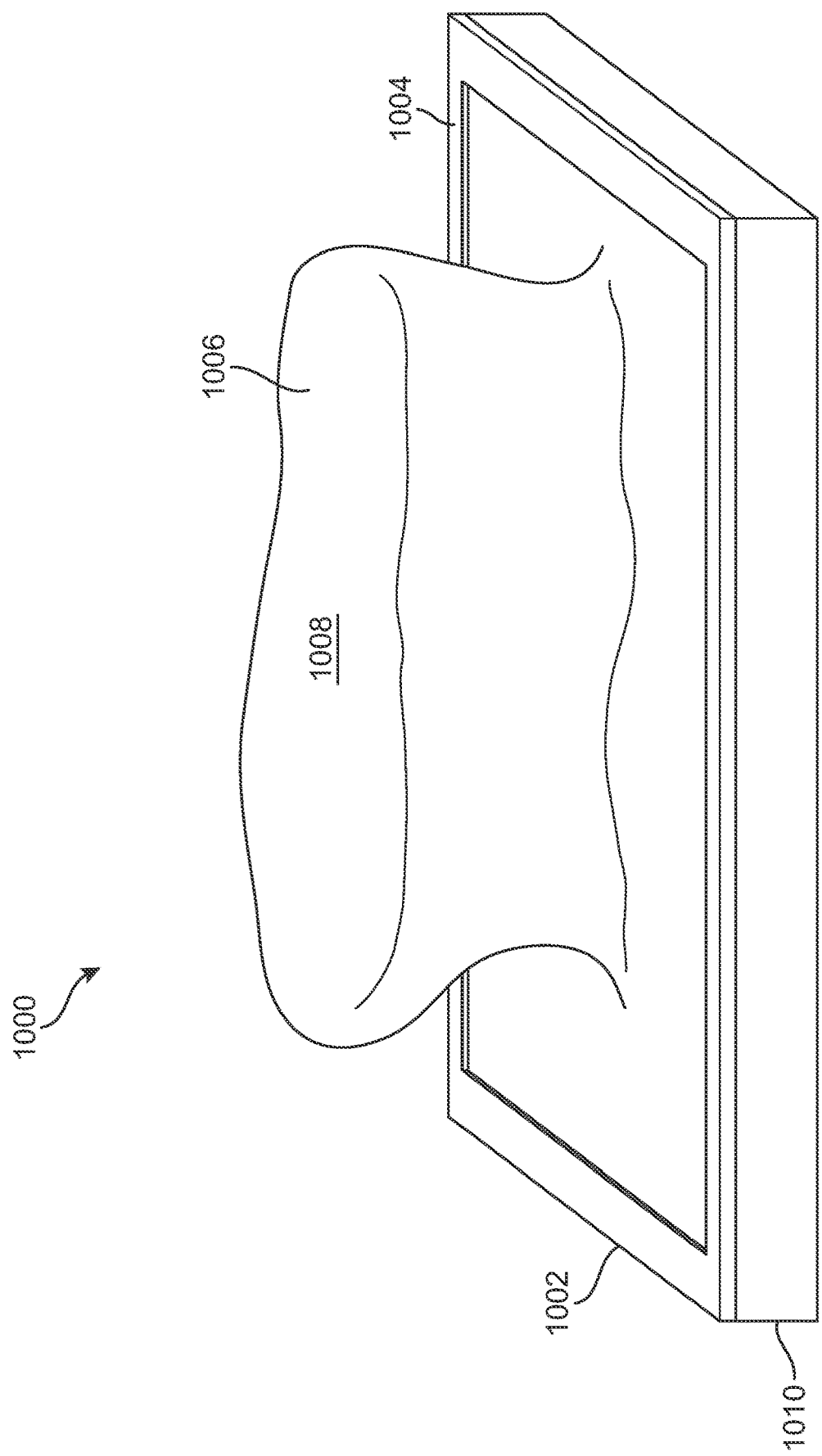
FIG. 15 is a representational view of a closed vacuum press for vacuum forming a knit sole system.

Next, FIG. 14 illustrates moveable portion 1002 of vacuum press 1000 being moved towards base portion 1010 to place vacuum press 1000 in a closed position before application of the vacuum forming step. As shown in this embodiment, inside surface 1009 of flexible membrane 1006 is being brought towards outsole bottom surface 114 arranged on last 1012. FIG. 15 illustrates vacuum press 1000 in a closed position with moveable portion 1002 brought into contact with base portion 1010. Together, moveable portion 1002 and base portion 1010 form a seal with flexible membrane 1006 disposed around and covering last 1012. As shown in FIG. 15, outside surface 1008 of flexible membrane 1006 extends upwards and away from base portion 1010 where last 1012 having upper 120 placed thereon is located. In this embodiment, vacuum press 1000 is prepared for the application of the vacuum forming process.

Figure 16:
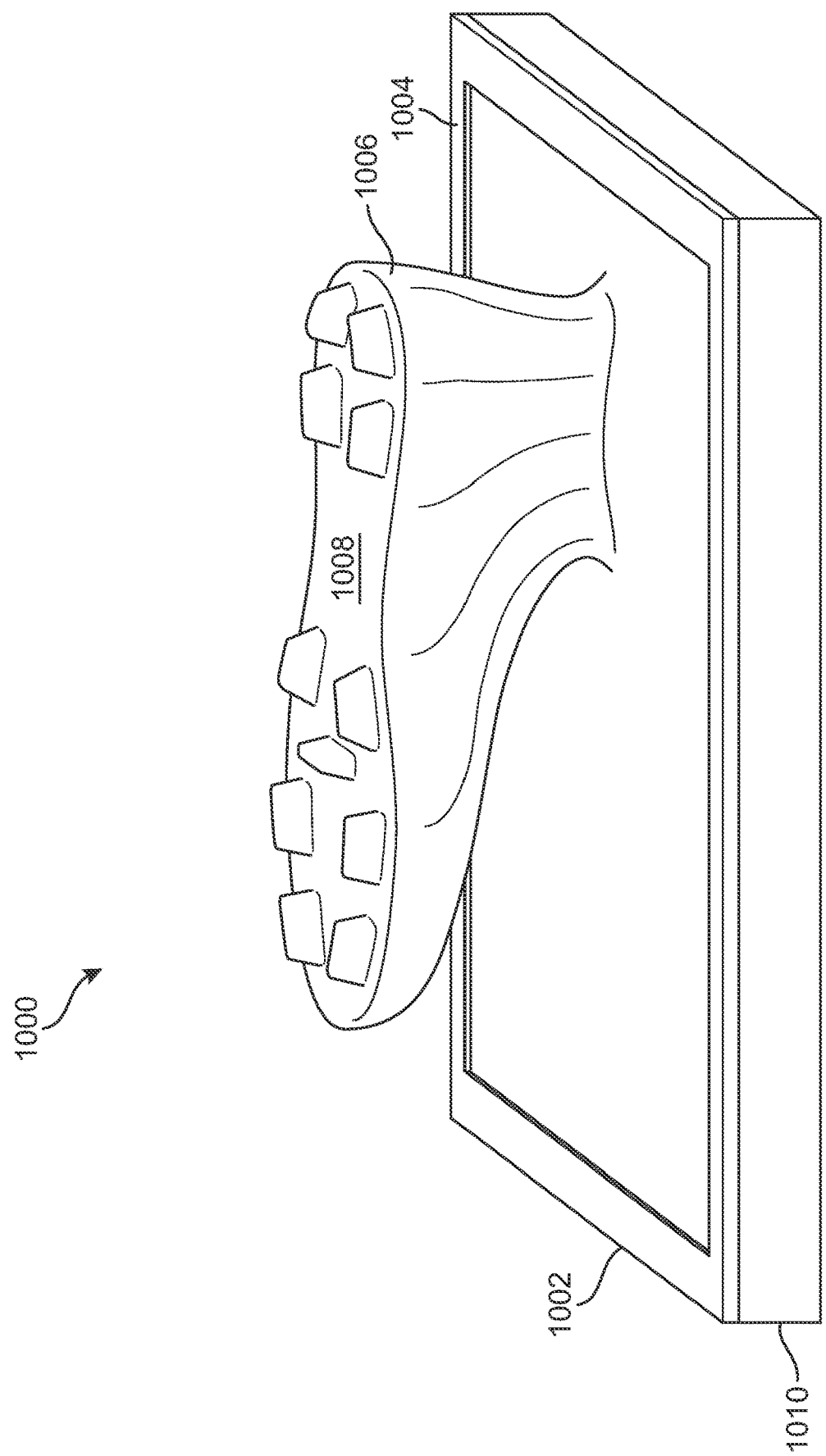
FIG. 16 is a representational view of a vacuum press applying vacuum pressure to a knitted component for vacuum forming a knit sole system.

FIG. 16 illustrates a representation of the vacuum forming process using vacuum press 1000 on last 1012 having upper 120 placed thereon. As shown in this embodiment, the application of a vacuum within the interior of vacuum press 1000 between moveable portion 1002 and base portion 1010 draws flexible membrane 1006 down towards base portion 1010. With this configuration, inside surface 1009 of flexible membrane 1006 exerts pressure onto upper 120 placed upon last 1012, including insert member 300 located on bottom surface 1014 of last 1012. Accordingly, the pressure of the vacuum forming process causes knitted component lower portion 111 of upper 120 on last 1012 to be drawn down onto bottom side 304 of insert member 300 that includes protuberances 310. In some embodiments, heat also may be applied during the vacuum forming process along with the pressure from the vacuum.

Figure 17:
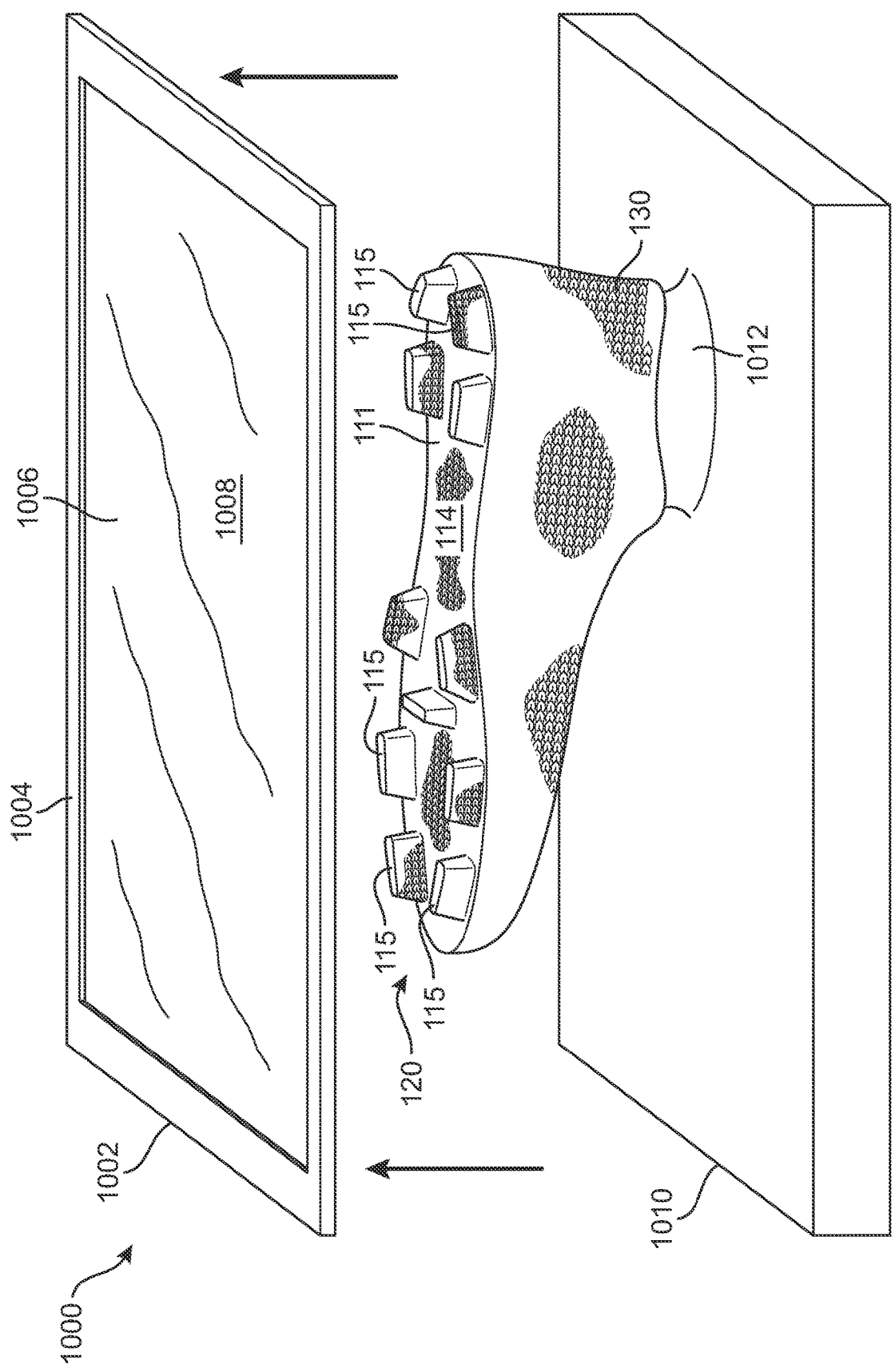
FIG. 17 is a representational view of a vacuum press being removed from a vacuum formed knit sole system.

Referring now to FIG. 17, moveable portion 1002 is moved to the open position away from base portion 1010 after the application of the vacuum forming process. In this embodiment, knit outsole 112 including cleat members 115 is shown formed on outsole bottom surface 114 of knitted component lower portion 111 of upper 120 placed on last 1012. As described above, the location, size, and arrangement of cleat members 115 corresponds and aligns with the location, size, and arrangement of protuberances 310 on bottom side 304 of insert member 300 that has been placed on last 1012. With this arrangement, a one-piece foot-enclosing bootie may be formed with a knit outsole.

In addition, insert member 300 may be used not only for forming the knit outsole during the vacuum forming process, such as process 800 described above, but may also remain disposed with the interior of upper 120 and placed in relation with outsole top surface 113 such that protuberances 310 align with and fill cavities of cleat members 115. With this arrangement, insert member 300 may both form knit outsole 112 and provide cushioning to a foot of a wearer and/or reinforcement to cleat members 115.

In some embodiments, additional components or elements may be associated with a sole system, including sole system 110, to provide for enhanced traction and/or wear resistance to portions of the article of footwear. In an exemplary embodiment, sole system 110 may include provisions that at least partially cover portions of cleat members 115 on outsole bottom surface 114. In one embodiment, sole system 110 may include cap elements 1800 that at least partially cover portions of cleat members 115 on outsole bottom surface 114 of knit outsole 112. In this embodiment, cleat face 116 of cleat members 115 is formed from a knit surface of knitted component lower portion 111 and cap elements 1800 may be attached or joined to cleat face 116 to at least partially cover this knit surface.

Figure 19:
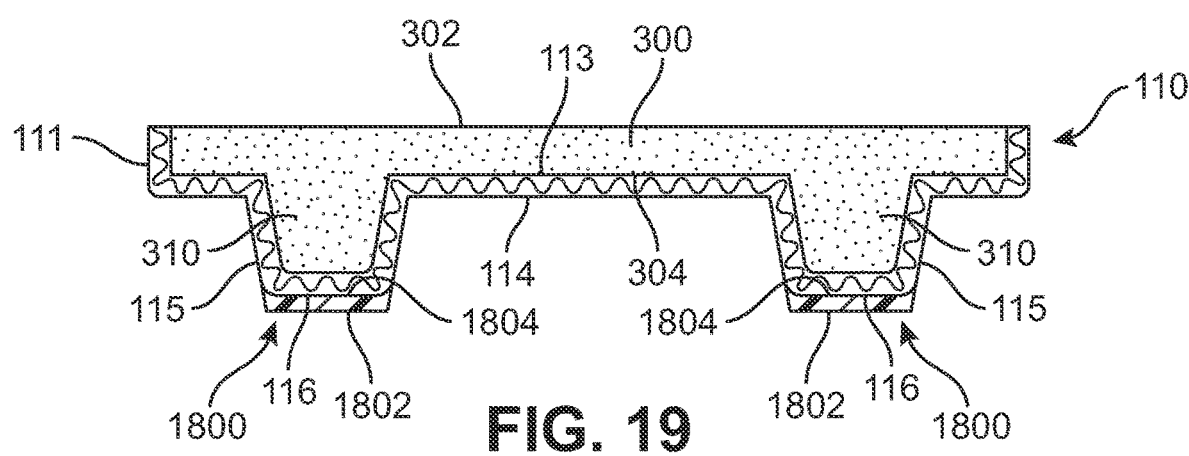
FIG. 19 is a cross-sectional view of an exemplary embodiment of an article of footwear including a knit sole system with cap elements on cleat members.

In an exemplary embodiment, cap elements 1800 may include a top side 1802 and an opposite bottom side 1804. As shown in FIG. 19, top side 1802 of cap element 1800 is configured to face away from outsole bottom surface 114 and may directly engage with a ground surface when an article is worn. Bottom side 1804 of cap element 1800 is configured to be attached or joined with cleat face 116 on cleat member 115. In various embodiments, cap elements 1800 may be joined with or attached to cleat face 116 using any suitable mechanism. For example, in some cases, cap elements 1800 may be bonded to cleat face 116 using a thermoplastic polymer material. In other cases, cap elements 1800 may be attached to cleat face 116 by directly forming cap elements 1800 onto the knit surface using a molding or printing process. In still other cases, cap elements 1800 may be adhesively joined to cleat face 116. Additionally, in some embodiments, portions of a knitted component forming a knit outsole, including knitted component lower portion 111, may include yarns that facilitate or assist with attaching cap elements 1800 to the knit outsole. For example, fusible yarns or yarns incorporating a thermoplastic polymer material may be used to facilitate or assist with attaching cap elements 1800 to the knit outsole.

In some embodiments, cap elements 1800 may be formed from any suitable material that may be used to form a traction element or an outsole. Examples of suitable materials include, but are not limited to: polymers, elastomers, siloxanes, natural rubber, other synthetic rubbers, aluminum, steel, natural leather, synthetic leather, plastics, or other materials suitable for providing traction or protection. With this configuration, cap elements 1800 may cover portions of cleat face 116 of cleat members 115 so as to provide wear protection to the knit surface of knitted component lower portion 111 forming knit outsole 112. In addition, cap elements 1800 may also be configured to provide enhanced traction or a gripping surface to cleat members 115 and/or portions of the knit outsole 112.

Figure 18:
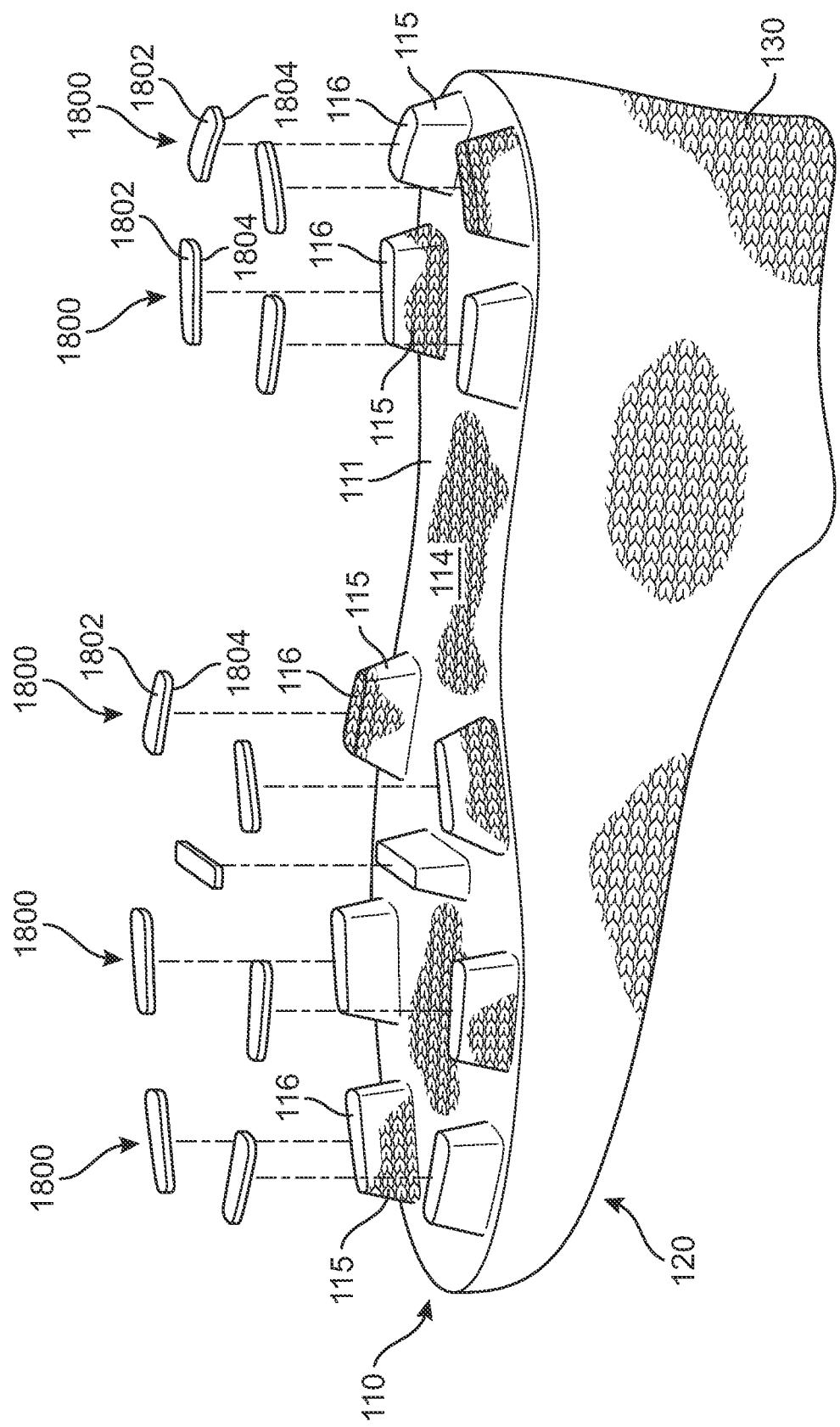
FIG. 18 is an exploded view of an exemplary embodiment of cap elements disposed on cleat members of a knit sole system.

FIGS. 18 and 19 illustrates an exemplary embodiment of cap element 1800 that has a shape that approximately corresponds with and is similar to the shape of cleat face 116. However, in other embodiments, a cap element may have different shapes and/or configurations. FIG. 20 through 23 various alternate embodiments of cap elements that may be used with knit outsole 112 to at least partially cover a portion of one or more cleat members 115.

Figure 20:
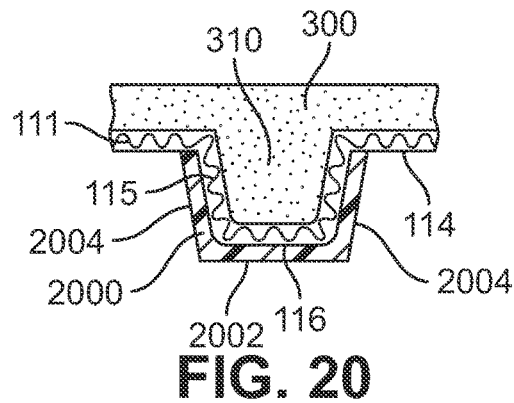
FIG. 20 is a cross-sectional view of an alternate embodiment of a cap element for a cleat member of a knit sole system.

Referring now to FIG. 20, an alternate embodiment of a cap element 2000 is illustrated. In an exemplary embodiment, cap element 2000 may entirely cover cleat face 116 of cleat member 115, as well as extending up along one or both sides of cleat member 115. In this embodiment, cap element 2000 includes a lower portion 2002 that covers cleat face 116 of cleat member 115 and two extending portions 2004 disposed on either side of lower portion 2002 that extend away from lower portion 2002 along the sides of cleat member 115 towards outsole bottom surface 114. In some cases, extending portions 2004 may extend at least partially along the sides of cleat member 115. In other cases, extending portions 2004 may extend the entirety of the sides of cleat member 115 to an area adjacent to or abutting with outsole bottom surface 114. With this configuration, an entirety of cleat member 115, or at least a substantial majority of cleat member 115, may be covered by cap element 2000. In some cases, cap element 2000 may be used in embodiments where additional protection or rigidity for cleat member 115 of knit outsole 112 is desired, in addition to enhanced traction that may be generally provided by a cap element.

Figure 21:
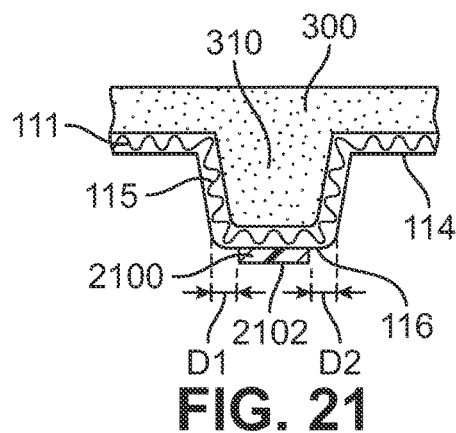
FIG. 21 is a cross-sectional view of another alternate embodiment of a cap element for a cleat member of a knit sole system.

Referring now to FIG. 21, another alternate embodiment of a cap element 2100 is illustrated. In an exemplary embodiment, cap element 2100 may extend less than the entirety of cleat face 116 of cleat member 115. In this embodiment, cap element 2100 includes a lower portion 2102 that covers less than the entirety of cleat face 116 of cleat member 115. In an exemplary embodiment, cap element 2100 may be located approximately a first distance D1 from one side of cleat member 115 and a second distance D2 from the opposite side of cleat member 115. In some cases, first distance D1 and second distance D2 may be approximately equal so as to center cap element 2100 and lower portion 2102 on cleat face 116 of cleat member 115. In other cases, first distance D1 and second distance D2 may be different so as to offset cap element 2100 towards one side or the other of cleat face 116. With this configuration, a portion less than the entirety of cleat face 116 of cleat member 115 may be covered by cap element 2100. In some cases, cap element 2100 may be used in embodiments where enhanced traction for specific portions of cleat member 115 of knit outsole 112 is desired.

Figure 22:
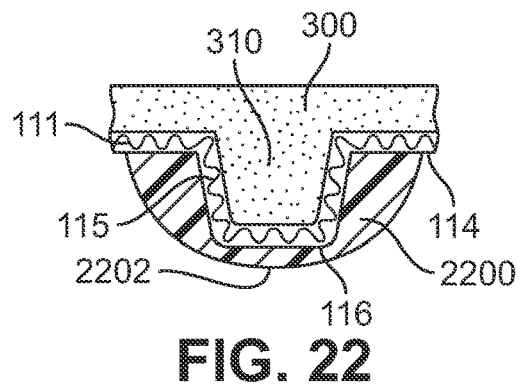
FIG. 22 is a cross-sectional view of another alternate embodiment of a cap element for a cleat member of a knit sole system.

Referring now to FIG. 22, another alternate embodiment of a cap element 2200 is illustrated. In an exemplary embodiment, cap element 2200 may entirely cover cleat face 116 of cleat member 115, as well as extending up along one or both sides of cleat member 115 and also covering a portion of outsole bottom surface 114. In this embodiment, cap element 2200 includes a lower portion 2202 that covers cleat face 116 of cleat member 115 and further extends on either side of cleat member 115 and towards outsole bottom surface 114, where cap element 2200 also covers at least a portion of outsole bottom surface 114. In some cases, cap element 2200 may be configured in the shape of a semi-spherical or hemi-spherical dome that covers over cleat member 115. In other cases, cap element 2200 may have a different shape that covers cleat member 115 and a portion of outsole bottom surface 114. With this configuration, an entirety of cleat member 115 and a portion of outsole bottom surface 114 may be covered by cap element 2200. In some cases, cap element 2200 may be used in embodiments where a change in the shape of cleat member 115 of knit outsole 112 is desired, or where the material forming cap element 2200 is used to reinforce sides of cleat member 115, in addition to enhanced traction that may be generally provided by a cap element.

Figure 23:
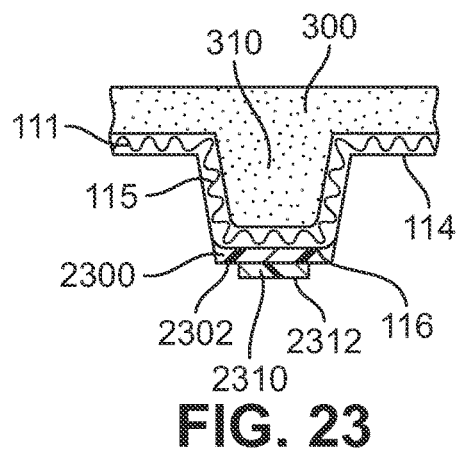
FIG. 23 is a cross-sectional view of another alternate embodiment of a cap element with a tiered arrangement for a cleat member of a knit sole system.

Referring now to FIG. 23, another alternate embodiment of a cap element 2300 is illustrated. In an exemplary embodiment, cap element 2300 may have a tiered configuration that presents at least two different surfaces having different heights extending away from cleat face 116 of cleat member 115 in the vertical direction. In an exemplary embodiment, tiered cap element 2300 may combine features of previous embodiments of cap elements, described above. For example, in this embodiment, tiered cap element 2300 may generally include the features of cap element 1800 with the features of cap element 2100. As shown in FIG. 23, tiered cap element 2300 includes a lower portion 2302 that covers cleat face 116 of cleat member 115, and presents a first surface located at a first height from cleat face 116. In addition, tiered cap element 2300 further includes an upper portion 2310 that presents a second surface 2312 located at a second height from cleat face 116 that is greater than and located on top of the first surface of lower portion 2302. With this configuration, benefits of multiple configurations of cap elements may be combined with cap element 2300. In other embodiments, other features of the various embodiments of cap elements described above may be similarly combined together into other embodiments of a cap element for use with knit outsole 112 and sole system 110.

Figure 24:
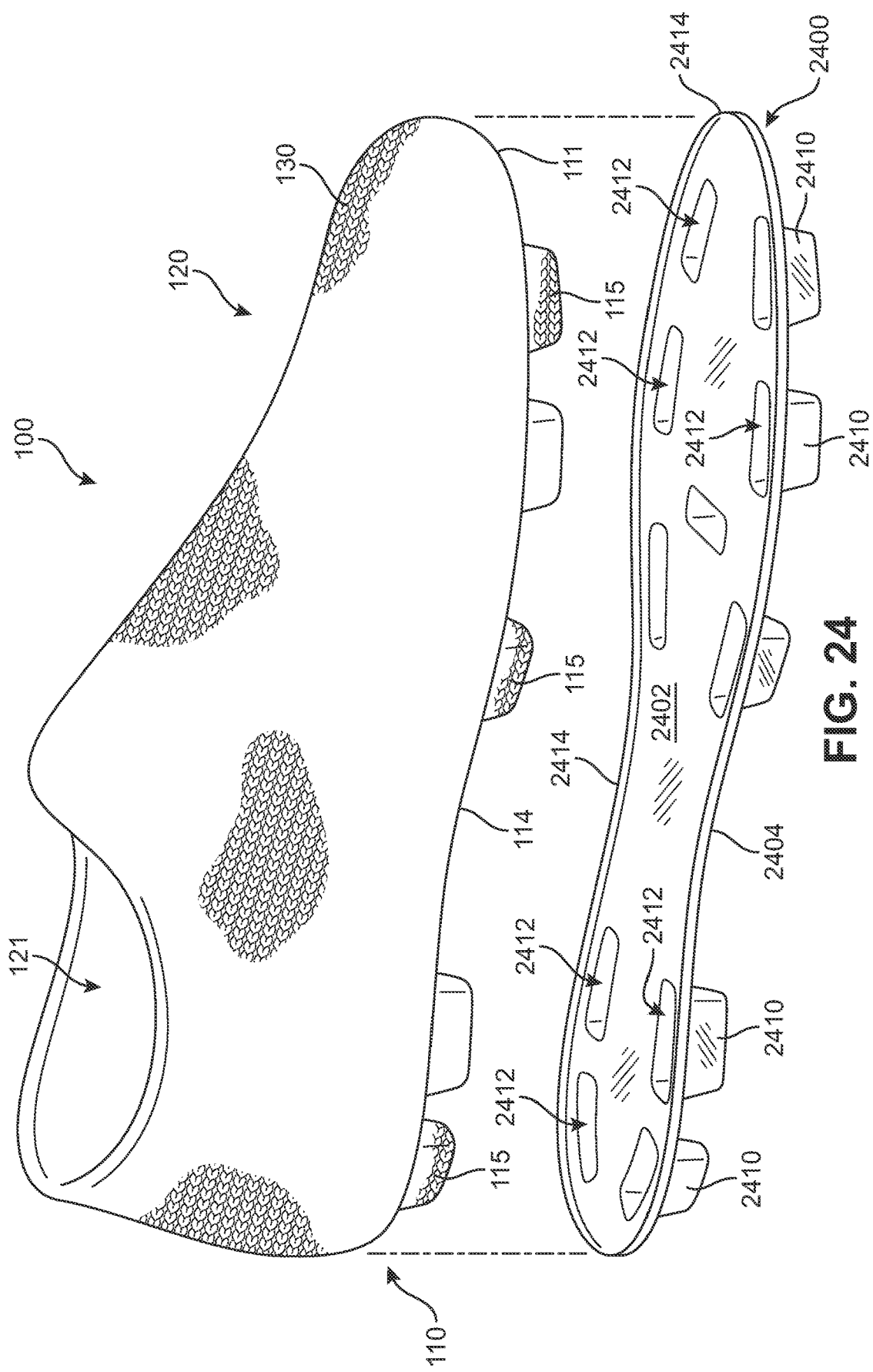
FIG. 24 is an exploded view of an exemplary embodiment of an outsole cover assembly for a knit sole system of an article of footwear.
Figure 25:
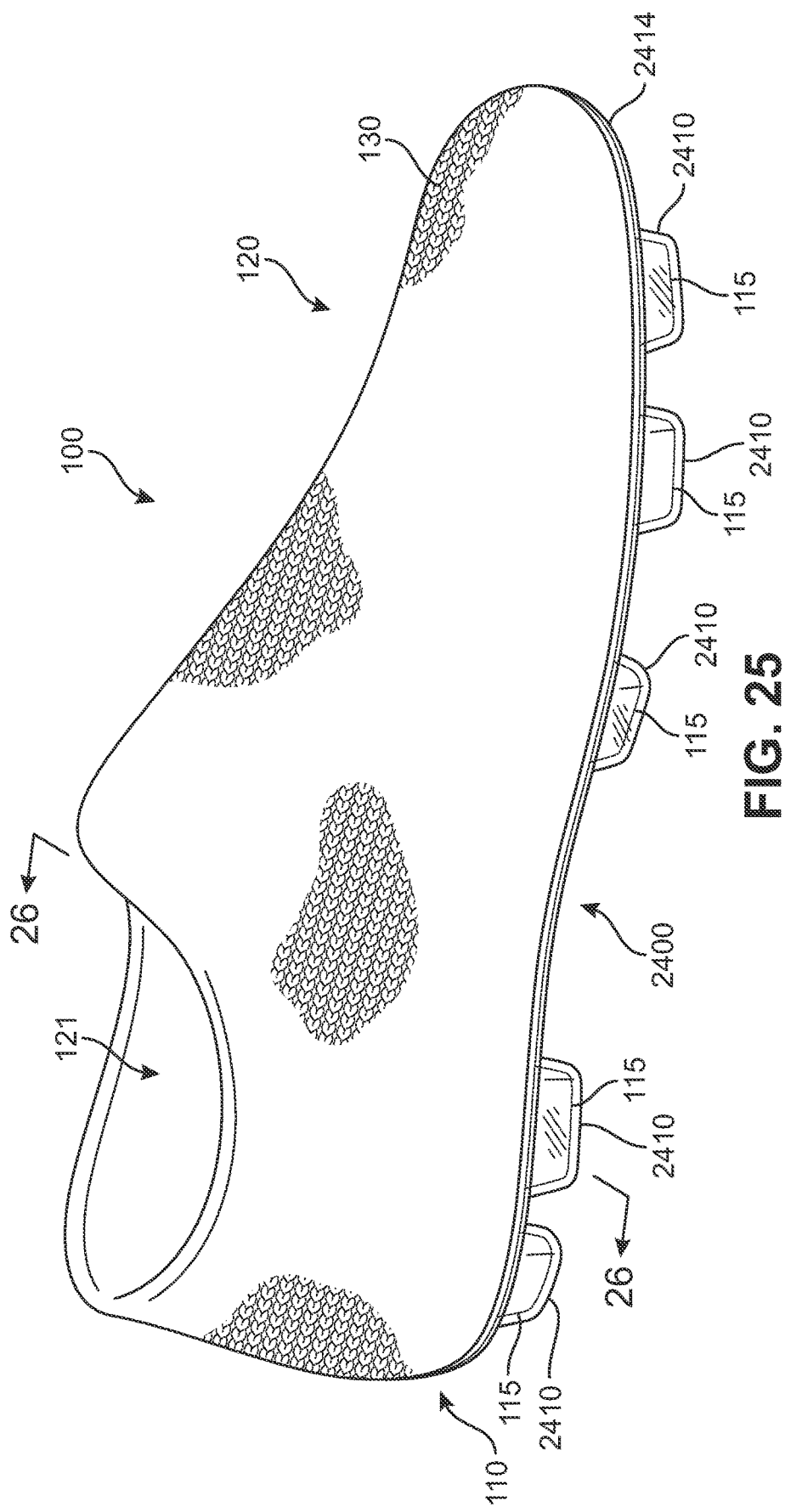
FIG. 25 is an isometric view of the exemplary embodiment of an outsole cover assembly for a knit sole system of an article of footwear.
Figure 26:
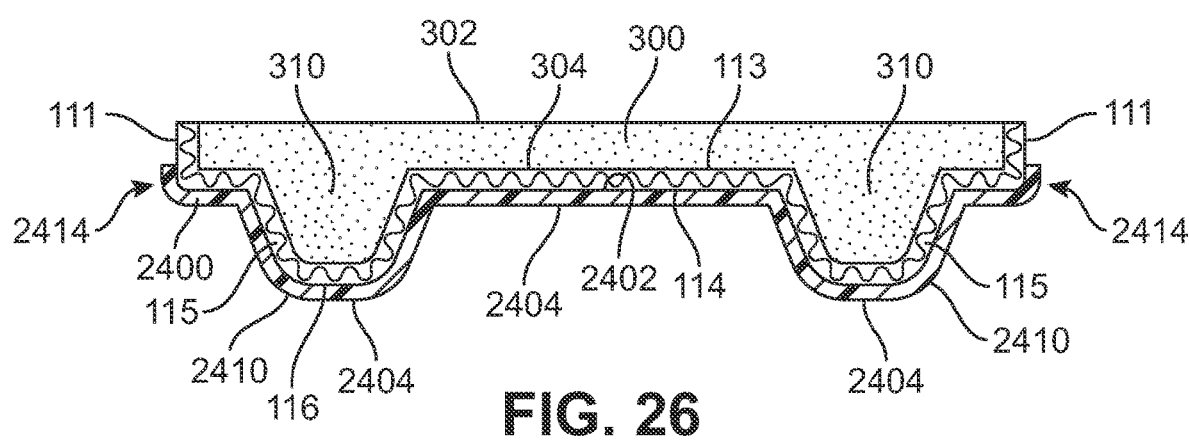
FIG. 26 is a cross-sectional view of the exemplary embodiment of an outsole cover assembly for a knit sole system of an article of footwear taken along line 26-26 in FIG. 25.

In some embodiments, rather than providing individual cap elements to cover each cleat member 115 of knit outsole 112, an outsole cover assembly may be provided to cover all of knit outsole 112, including cleat members 115 and outsole bottom surface 114. FIGS. 24 through 26 illustrate an exemplary embodiment of an outsole cover assembly 2400 that may be configured to cover all of knit outsole 112, including cleat members 115 and outsole bottom surface 114.

Referring now to FIG. 24, outsole cover assembly 2400 is shown in exploded relation with article 100. In an exemplary embodiment, outsole cover assembly 2400 has a top surface 2402 and an opposite bottom surface 2404. Top surface 2402 is configured to be brought in relation with outsole bottom surface 114. In some cases, top surface 2402 of outsole cover assembly 2400 may be joined with or attached to outsole bottom surface 114 of knit outsole 112 using any of the methods described above for attaching a cap element to cleat members 115 of knit outsole. Bottom surface 2404 of outsole cover assembly 2400 is configured to interact with a ground surface and may assist with providing durability, protection, and/or traction to sole system 110 of article 100.

In some embodiments, outsole cover assembly 2400 may be formed with one or more recesses 2412 in top surface 2402 of outsole cover assembly 2400 that are configured to align with and correspond to cleat members 115 on outsole bottom surface 114 of knit outsole 112. In an exemplary embodiment, the location, size, and arrangement of recesses 2412 of outsole cover assembly 2400 may be selected to be substantially similar to the location, size, and arrangement of cleat members 115 on outsole bottom surface 114 of knit outsole 112. In one embodiment, recesses 2412 form cleat cover elements 2410 that extend outward from bottom surface 2404 of outsole cover assembly 2400. With this configuration, an entirety of cleat member 115 and outsole bottom surface 114 of knit outsole 112 may be covered by cleat cover elements 2410 and outsole cover assembly 2400. Accordingly, as shown in FIG. 25, when knit outsole 112 of article 100 is brought in relation to and joined with outsole cover assembly 2400, cleat members 115 are received into recesses 2412 of outsole cover assembly 2400.

In some embodiments, outsole cover assembly 2400 may further include a lip 2414 that extends around an outer periphery along a peripheral edge of outsole cover assembly 2400. Lip 2414 may be configured to extend above top surface 2402 of outsole cover assembly 2400 along the outer periphery to form a wall or raised portion. Additionally, lip 2414 may define a shape of the outer periphery of outsole cover assembly 2400 that is substantially similar to and corresponds with the shape of knit outsole 112, including outsole bottom surface 114. In some embodiments, when article 100 is brought in relation with outsole cover assembly 2400, lip 2414 may at least partially extend upwards along medial or lateral sides of knitted component lower portion 111, as shown in FIG. 26. With this configuration, lip 2414 may assist with aligning article 100 within outsole cover assembly 2400 and also assist with providing support and/or rigidity to portions of sole system 110 and article 100.

In various embodiments, outsole cover assembly 2400 may be made from any suitable material, including any of the materials described above for making a cap element, as well as any other suitable materials for making an outsole. In addition, while in the present embodiments outsole cover assembly 2400 covers substantially all of knit outsole 112 and cleat members 115, in other embodiments, an outsole cover assembly may cover only portions of knit outsole 112 and/or selected cleat members 115 located in specific portions or regions of sole system 110. With this configuration, desired additional durability, wear resistance, rigidity, and/or traction may be provided by an outsole assembly in selected areas of sole system 110.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims. As used in the claims, "any of", when identifying the previous claims, is intended to mean (i) any one claim or (ii) any combination of two or more claims identified.

I claim:

1. A sole system for an article of footwear, the sole system comprising:
   a knitted component comprising a plurality of knitted cleat members located on an underfoot portion of the knitted component; and
   an outsole cover assembly comprising a plurality of cleat cover elements that define a plurality of recesses that are alignable with the plurality of knitted cleat members,
   wherein all of the plurality of cleat cover elements are interconnected on the outsole cover assembly, and wherein the outsole cover assembly is shaped to cover the entire underfoot portion.

2. The sole system of claim 1, wherein the knitted component comprises an upper that includes a medial side and a lateral side.

3. The sole system of claim 2, wherein the outsole cover assembly comprises a lip that extends around a perimeter of the outsole cover assembly, and wherein, when the plurality of knitted cleat members are positioned in the plurality of recesses, the lip extends partially over at least one of the medial side and the lateral side.

4. The sole system of claim 1, wherein the outsole cover assembly provides rigidity.

5. The sole system of claim 2, wherein the knitted component extends to a collar of the upper.

6. The sole system of claim 1, further comprising an insert member that includes a plurality of protuberances that are alignable with the plurality of knitted cleat members.

7. An article of footwear, comprising:
an upper that is at least partially formed with a knitted component, the knitted component comprising a plurality of knitted cleat members located on an underfoot portion, the knitted component extending from the underfoot portion to proximate a collar; and
an outsole cover assembly comprising a plurality of cleat cover elements that define a plurality of recesses that are alignable with the plurality of knitted cleat members, wherein all of the plurality of cleat cover elements are interconnected and wherein the outsole cover assembly is shaped to cover the entire underfoot portion.

8. The article of footwear of claim 7, wherein the outsole cover assembly comprises a lip that extends around a perimeter of the outsole cover assembly, and wherein, when the plurality of knitted cleat members are positioned in the plurality of recesses, the lip extends partially over at least one of a medial side of the upper and a lateral side of the upper.

9. The article of footwear of claim 7, wherein the outsole cover assembly provides rigidity.

10. The article of footwear of claim 7, wherein the outsole cover assembly is bonded to the plurality of knitted cleat members with a thermoplastic polymer material.

11. The article of footwear of claim 7, further comprising an insert member that includes a plurality of protuberances that are alignable with the plurality of knitted cleat members.

12. A method, comprising:
forming a knitted component that comprises a plurality of knitted cleat members located on an underfoot portion; and
securing the knitted component to an outsole cover assembly comprising a plurality of cleat cover elements that define a plurality of recesses that are alignable with the plurality of knitted cleat members,
wherein all of the plurality of cleat cover elements are interconnected on the outsole cover assembly, and wherein the outsole cover assembly is shaped to cover the entire underfoot portion.

13. The method of claim 12, wherein the knitted component comprises an upper that includes a medial side and a lateral side.

14. The method of claim 13, wherein the outsole cover assembly comprises a lip that extends around a perimeter of the outsole cover assembly, such that when the plurality of knitted cleat members are positioned in the plurality of recesses, the lip extends partially over at least one of the medial side and the lateral side.

15. The method of claim 12, further comprising forming the outsole cover assembly to provide rigidity.

16. The method of claim 12, wherein forming the knitted component comprises forming a one-piece knitted element into an upper, such that the one-piece knitted element integrally extends from the underfoot portion to a collar of the upper.

* * * * *